(12) United States Patent
Koyama

(10) Patent No.: US 12,304,257 B2
(45) Date of Patent: May 20, 2025

(54) PNEUMATIC TIRE AND METHOD FOR MANUFACTURING PNEUMATIC TIRE

(71) Applicant: The Yokohama Rubber Co., LTD., Tokyo (JP)

(72) Inventor: Noriyoshi Koyama, Kanagawa (JP)

(73) Assignee: The Yokohama Rubber Co., LTD., Tokyo (JP)

(*) Notice: Subject to any disclaimer, the term of this patent is extended or adjusted under 35 U.S.C. 154(b) by 778 days.

(21) Appl. No.: 17/272,573

(22) PCT Filed: Jun. 13, 2019

(86) PCT No.: PCT/JP2019/023578
§ 371 (c)(1),
(2) Date: Mar. 1, 2021

(87) PCT Pub. No.: WO2020/049823
PCT Pub. Date: Mar. 12, 2020

(65) Prior Publication Data
US 2021/0354514 A1   Nov. 18, 2021

(30) Foreign Application Priority Data
Sep. 6, 2018 (JP) ................................. 2018-166788

(51) Int. Cl.
*B60C 9/20* (2006.01)
*B29D 30/30* (2006.01)
*B60C 9/22* (2006.01)

(52) U.S. Cl.
CPC ............ *B60C 9/20* (2013.01); *B29D 30/3057* (2013.01); *B29D 2030/3092* (2013.01); *B60C 2009/2223* (2013.01); *B60C 2009/2271* (2013.01)

(58) Field of Classification Search
CPC ..... B60C 9/26; B60C 9/263; B60C 2009/266; B60C 9/22; B60C 9/2204; B60C 2009/2223
See application file for complete search history.

(56) References Cited

U.S. PATENT DOCUMENTS

| | | | | |
|---|---|---|---|---|
| 9,321,230 B2 * | 4/2016 | Maehara | ............... | B60C 11/00 |
| 2004/0250938 A1 * | 12/2004 | Matsunami | ............... | B60C 9/09 |
| | | | | 152/550 |

(Continued)

FOREIGN PATENT DOCUMENTS

| | | | |
|---|---|---|---|
| CN | 105682942 A | | 6/2016 |
| DE | 3535064 | * | 1/1990 |

(Continued)

*Primary Examiner* — Justin R Fischer
(74) *Attorney, Agent, or Firm* — Thorpe North & Western

(57) ABSTRACT

A belt cover layer is formed by spirally winding belt cover materials including a first cover material and a second cover material. When one side in a tire width direction with respect to a tire equatorial plane is defined as a first side and another side is defined as a second side, the first cover material is disposed from a position between a shoulder region on the second side and the tire equatorial plane to a shoulder region on the first side. The second cover material is disposed from a position between the shoulder region (Ash) on the first side and the tire equatorial plane to the shoulder region on the second side. The first cover material and the second cover material have an overlapping portion at a position where positions in the tire width direction become positions identical to one another.

14 Claims, 13 Drawing Sheets

(56) References Cited

U.S. PATENT DOCUMENTS

| | | | |
|---|---|---|---|
| 2006/0000534 A1* | 1/2006 | Matsunaga | B60C 9/2204 |
| | | | 152/533 |
| 2015/0136294 A1* | 5/2015 | Lamontia | B60C 9/185 |
| | | | 156/123 |
| 2016/0257169 A1 | 9/2016 | Kuwayama et al. | |

FOREIGN PATENT DOCUMENTS

| | | |
|---|---|---|
| EP | 3064374 A1 | 9/2016 |
| JP | 2005-041328 A | 2/2005 |
| JP | 2010-64644 A | 3/2010 |
| JP | 4635366 B2 | 2/2011 |
| JP | 4687201 B2 | 5/2011 |
| JP | 2011-136669 A | 7/2011 |
| JP | 4865259 B2 | 2/2012 |
| JP | 2015-85754 A | 5/2015 |
| JP | 2017-137032 A | 8/2017 |
| WO | 2015/063972 A1 | 5/2015 |

\* cited by examiner

| | Conventional Example 1 | Conventional Example 2 | Example 1 | Example 2 | Example 3 | Example 4 | Example 5 |
|---|---|---|---|---|---|---|---|
| Presence of overlapping portion | No | Yes | Yes | Yes | Yes | Yes | Yes |
| Number of belt cover materials constituting overlapping portion | (1) | 1 | 2 | 2 | 2 | 2 | 2 |
| Presence of variation of width of overlapping portion | - | No | Yes | Yes | Yes | Yes | Yes |
| Minimum width of overlapping portion | - | 20 mm | 4 mm | 4 mm | 5 mm | 10 mm | 24 mm |
| Maximum width of overlapping portion | - | 20 mm | 41 mm | 24 mm | 24 mm | 24 mm | 30 mm |
| Presence of adjacent wrap portion | - | No | No | No | No | No | No |
| Width of adjacent wrap portion to width of belt cover material | - | - | - | - | - | - | - |
| Plunger test (J) | 560 | 608 | 586 | 574 | 602 | 614 | 620 |
| Productivity | 100 | 92 | 190 | 200 | 198 | 192 | 188 |

FIG. 12A

|  | Example 6 | Example 7 | Example 8 | Example 9 | Example 10 | Example 11 | Example 12 |
|---|---|---|---|---|---|---|---|
| Presence of overlapping portion | Yes | Yes | Yes | Yes | Yes | Yes | Yes |
| Number of belt cover materials constituting overlapping portion | 2 | 2 | 2 | 2 | 2 | 2 | 2 |
| Presence of variation of width of overlapping portion | Yes | Yes | Yes | Yes | Yes | Yes | Yes |
| Minimum width of overlapping portion | 24 mm | 24 mm | 24 mm | 24 mm | 24 mm | 24 mm | 24 mm |
| Maximum width of overlapping portion | 40 mm | 41 mm | 30 mm | 30 mm | 30 mm | 30 mm | 30 mm |
| Presence of adjacent wrap portion | No | No | Yes | Yes | Yes | Yes | Yes |
| Width of adjacent wrap portion to width of belt cover material | - | - | 19% | 20% | 45% | 70% | 71% |
| Plunger test (J) | 626 | 626 | 660 | 662 | 680 | 692 | 694 |
| Productivity | 184 | 180 | 174 | 172 | 164 | 158 | 156 |

FIG. 12B

PNEUMATIC TIRE AND METHOD FOR MANUFACTURING PNEUMATIC TIRE

TECHNICAL FIELD

The present technology relates to a pneumatic tire, and a method for manufacturing a pneumatic tire.

BACKGROUND ART

Some pneumatic tires in the related art have achieved desired performance by devising a member disposed on an outer side in a tire radial direction of a belt layer. For example, a pneumatic tire described in Japan Patent No. 4865259 improves projection resistance in such a way that two belt protecting layers are disposed on an outer side in a tire radial direction of a belt layer, and the belt protecting layer on the outer side in the tire radial direction has a narrower width than a width of the belt protecting layer on an inner side in the tire radial direction. In a pneumatic tire described in Japan Unexamined Patent Publication No. 2010-64644, a belt reinforcing layer is disposed between a tread portion and a belt layer, and the belt reinforcing layer is configured to be three layers on a tire equatorial portion to ensure breaking energy while suppressing an increase in weight.

A pneumatic tire described in Japan Unexamined Patent Publication No. 2017-137032 includes a band-like sound absorbing member adhered to a tire inner surface in a tread portion, a full cover layer disposed on an outer circumferential side of a belt layer, and a center cover layer disposed on an outer circumferential side of the full cover layer and locally covering a tire width central region. Defining respective width of the band-like sound absorbing member and the belt layer and width of the center cover layer and the band-like sound absorbing member reduces a decrease in high-speed durability due to accumulation of heat in the band-like sound absorbing member while obtaining sufficient quietness by the band-like sound absorbing member.

In a pneumatic tire described in Japan Patent No. 4635366, a belt cover layer constituted by an end portion belt cover layer and a central portion belt cover layer is disposed outside a belt layer, and a tensile strength of organic fiber cords forming the end portion belt cover layer and the central portion belt cover layer and a sum of the end portion belt cover layer and the central portion belt cover layer are defined to ensure reduction in road noise in a high frequency band and weight reduction. Additionally, a pneumatic tire described in Japan Patent No. 4687201 includes a belt cover formed by spirally winding a strip material on an outer circumferential side of a belt layer. In the belt cover, lap winding of the strip material at a position covering an end portion in a tire width direction in the belt layer and a position covering a central portion in the tire width direction in the belt layer improves steering stability and durability.

Here, among pneumatic tires, for example, there are pneumatic tires that can accommodate a high load, such as a pneumatic tire with EXTRA LOAD standard. Such pneumatic tires can be used at relatively high air pressures for accommodating high loads. Meanwhile, when the air pressure of the pneumatic tire is increased, rigidity of a tread portion increases. As a result, the tread portion is less likely to deform when a foreign material is trodden, and a shock burst, which occurs caused by the tread of the foreign material, is likely to occur. That is, the use of the pneumatic tire at high air pressure is likely to reduce shock burst resistance performance, which is a resistance against a shock burst.

A shock burst is likely to occur by treading a foreign material on a road surface in a region at or near a tire equatorial plane on a ground contact surface of the tread portion. Accordingly, to improve shock burst resistance performance, reinforcement in the vicinity of the tire equatorial plane in the tread portion is effective. However, new addition of a member for reinforcement increases a manufacturing process by that much, thereby reducing productivity. Accordingly, improving productivity while suppressing a decrease in shock burst resistance performance has been extremely difficult.

SUMMARY

The present technology provides a pneumatic tire that allows improving productivity while suppressing a decrease in shock burst resistance performance and a method for manufacturing the pneumatic tire.

A pneumatic tire according to an embodiment of the present technology includes a tread portion, a belt layer, and a belt cover layer. The belt layer is disposed in the tread portion. The belt cover layer is disposed on an outer side in a tire radial direction of the belt layer. The belt cover layer is formed by spirally winding band-like belt cover materials on the outer side of the belt layer in the tire radial direction around a tire rotation axis. The belt cover materials include a first cover material and a second cover material. When one side in a tire width direction with respect to a tire equatorial plane is defined as a first side and another side in the tire width direction with respect to the tire equatorial plane is defined as a second side, the first cover material is disposed from a position between a shoulder region on the second side and the tire equatorial plane to a shoulder region on the first side. The second cover material is disposed from a position between the shoulder region on the first side and the tire equatorial plane to the shoulder region on the second side. The first cover material and the second cover material have an overlapping portion at a position where positions in the tire width direction become positions identical to one another. The first cover material and the second cover material overlap in the tire radial direction at the overlapping portion. The overlapping portion has a width in the tire width direction that varies depending on a position thereof in a tire circumferential direction.

In the pneumatic tire, the overlapping portion preferably has a minimum width of the width in the tire width direction of not less than 5 mm. The overlapping portion preferably has a maximum width of the width in the tire width direction of not greater than 40 mm.

In the pneumatic tire, the belt cover materials are preferably folded back in the tire radial direction at the shoulder regions.

In the pneumatic tire, the belt cover materials preferably have a width in the tire width direction of portions overlapping in the tire radial direction of within a range of from not less than 5% to not greater than 50% of a width in the tire width direction of the belt cover layer.

In the pneumatic tire, the belt cover material preferably includes an adjacent wrap portion where portions adjacent in the tire width direction overlap in the tire radial direction by the spiral winding. The adjacent wrap portion preferably has a width in the width direction of the belt cover materials in a range of from not less than 20% to not greater than 70% of a width of the belt cover materials.

In the pneumatic tire, at least one of the first cover material or the second cover material preferably includes the adjacent wrap portion such that the overlapping portion has a portion where the belt cover materials are three or more layers.

In the pneumatic tire, the first cover material and the second cover material preferably are an identical type.

A method for manufacturing a pneumatic tire according to an embodiment of the present technology spirally winds band-like belt cover materials on an outer side in a tire radial direction of a belt layer around a tire rotation axis to dispose a belt cover layer. The method includes: using a first cover material and a second cover material as the belt cover materials; when one side in a tire width direction with respect to a tire equatorial plane is defined as a first side and another side in the tire width direction with respect to the tire equatorial plane is defined as a second side, spirally winding the first cover material from a position between a shoulder region on the second side and the tire equatorial plane to a shoulder region on the first side; and spirally winding the second cover material from a position between the shoulder region on the first side and the tire equatorial plane to the shoulder region on the second side. Winding the first cover material and winding the second cover material overlap the first cover material and the second cover material in the tire radial direction at a portion where positions in the tire width direction are an identical position between the first cover material and the second cover material to form an overlapping portion. The overlapping portion has a width in the tire width direction that varies depending on a position thereof in a tire circumferential direction. The first cover material and the second cover material overlap in the tire radial direction at the overlapping portion.

In the method for manufacturing the pneumatic tire, the winding of the first cover material preferably spirally winds the first cover material from the position between the shoulder region on the second side and the tire equatorial plane to the shoulder region on the first side. The winding of the second cover material preferably spirally winds the second cover material from the position between the shoulder region on the first side and the tire equatorial plane to the shoulder region on the second side.

The pneumatic tire and the method for manufacturing the pneumatic tire according to the embodiment of the present technology provide an effect that allows improving productivity while suppressing a decrease in shock burst resistance performance.

BRIEF DESCRIPTION OF DRAWINGS

FIGS. 12A-12B include a table showing results of performance evaluation tests of pneumatic tires.

DETAILED DESCRIPTION

Embodiments of a pneumatic tire and a method for manufacturing a pneumatic tire according to embodiments of the present technology will be described in detail below with reference to the drawings. However, the present technology is not limited by the embodiment. Constituents of the following embodiments include elements that are essentially identical or that can be substituted or easily conceived of by a person skilled in the art.

First Embodiment

Pneumatic Tire

Herein, "tire radial direction" refers to the direction orthogonal to the rotation axis (not illustrated) of a pneumatic tire 1. "Inner side in the tire radial direction" refers to the direction toward the rotation axis in the tire radial direction. "Outer side in the tire radial direction" refers to the direction away from the rotation axis in the tire radial direction. Additionally, "Tire circumferential direction" refers to the circumferential direction with the rotation axis as the center axis. Additionally, "tire width direction" refers to a direction parallel with the rotation axis. "Inner side in the tire width direction" refers to a side toward a tire equatorial plane (tire equator line) CL in the tire width direction. "Outer side in the tire width direction" refers to a side away from the tire equatorial plane CL in the tire width direction. "Tire equatorial plane CL" refers to a plane orthogonal to the tire rotation axis and extending through the center of the tire width of the pneumatic tire 1. The tire equatorial plane CL is aligned, in the tire width direction, with a tire width direction center line corresponding to the center position of the pneumatic tire 1 in the tire width direction. "Tire width" is the width in the tire width direction between portions located on the outermost side in the tire width direction, or in other words, the distance between the portions that are the most distant from the tire equatorial plane CL in the tire width direction. "Tire equator line" refers to the line in the tire circumferential direction of the pneumatic tire 1 that lies on the tire equatorial plane CL.

Figure 1:
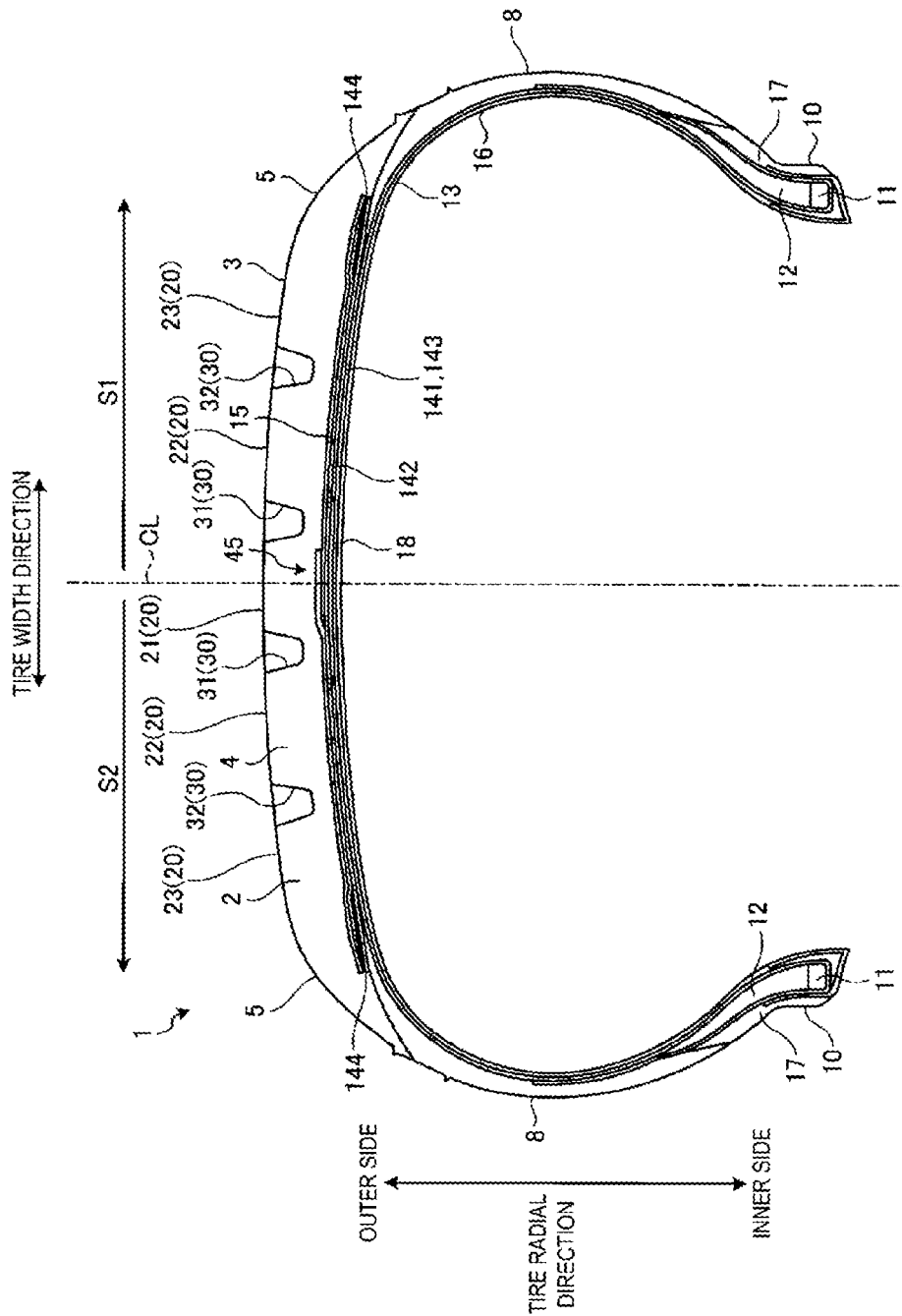
FIG. 1 is a meridian cross-sectional view illustrating a main portion of a pneumatic tire according to a first embodiment.

FIG. 1 is a meridian cross-sectional view illustrating a main portion of the pneumatic tire 1 according to a first embodiment. The pneumatic tire 1 according to the present first embodiment is the pneumatic tire 1 that can accommodate use at high loads, for example, the pneumatic tire 1 with EXTRA LOAD standard. In the pneumatic tire 1 according to the present first embodiment, a tread portion 2 is disposed on a portion on the outermost side in the tire radial direction when viewed in a meridian cross-section, and the tread portion 2 includes a tread rubber layer 4 made of a rubber composition. A surface of the tread portion 2, that is, a portion in contact with a road surface during traveling of a vehicle (not illustrated) having the pneumatic tires 1 mounted thereon is formed as a ground contact surface 3, and the ground contact surface 3 forms a part of a contour of the pneumatic tire 1. A plurality of main grooves 30 extending in the tire circumferential direction are formed in the ground contact surface 3 in the tread portion 2, and a plurality of land portions 20 are defined by the plurality of main grooves 30 on the surface of the tread portion 2. In the present first embodiment, four main grooves 30 are formed side by side in the tire width direction, and each two of the four main grooves 30 are disposed on both sides in the tire width direction of the tire equatorial plane CL. In other words, the four main grooves 30 in total are formed in the tread portion 2, including: two center main grooves 31 disposed on both sides of the tire equatorial plane CL; and two shoulder main grooves 32 disposed on an outer side in the tire width direction of each of the two center main grooves 31.

Note that "main groove 30" refers to a vertical groove in which at least a part is extending in the tire circumferential direction. In general, the main groove 30 has a groove width of not less than 3 mm and a groove depth of not less than 6 mm and has a tread wear indicator (slip sign) therein, indicating terminal stages of wear. In the present first embodiment, the main groove 30 has a groove width of not less than 6 mm and not greater than 25 mm and a groove depth of not less than 6 mm and not greater than 9 mm and is substantially parallel to a tire equator line (centerline) where the tire equatorial plane CL and the ground contact surface 3 intersect. The main grooves 30 may extend linearly in the tire circumferential direction or may be provided in a wave shape or a zigzag shape.

Among the land portions 20 defined by the main grooves 30, the land portion 20 positioned between the two center main grooves 31 and positioned on the tire equatorial plane CL is a center land portion 21. Moreover, the land portions 20 positioned between the adjacent center main grooves 31 and shoulder main grooves 32 and disposed on the outer side in the tire width direction of the center land portion 21 are second land portions 22. Moreover, the land portions 20 positioned on the outer side in the tire width direction of the second land portions 22 and adjacent to the second land portions 22 with the shoulder main grooves 32 disposed therebetween are shoulder land portions 23.

Note that the land portions 20 may be formed in a rib shape across one circumference in the tire circumferential direction, and a plurality of lug grooves (not illustrated) extending in the tire width direction may be formed in the tread portion 2. Thus, the land portions 20 may be defined by the main grooves 30 and the lug grooves, and each of the land portions 20 may be formed in a block shape. In the present first embodiment, the land portion 20 is formed as the rib-shaped land portion 20 formed across one circumference in the tire circumferential direction.

Shoulder portions 5 are positioned at both ends on outer sides of the tread portion 2 in the tire width direction, and sidewall portions 8 are disposed on inner sides in the tire radial direction of the shoulder portions 5. In other words, the sidewall portions 8 are disposed on both sides in the tire width direction of the tread portion 2. In other words, the sidewall portions 8 are disposed at two sections on both sides in the tire width direction of the pneumatic tire 1 and form portions exposed to the outermost sides in the tire width direction of the pneumatic tire 1.

A bead portion 10 is located on an inner side in the tire radial direction of each of the sidewall portions 8 located on both sides in the tire width direction. Similarly to the sidewall portions 8, the bead portions 10 are disposed at two sections on both sides of the tire equatorial plane CL. That is, the bead portions 10 are disposed as a pair on both sides in the tire width direction of the tire equatorial plane CL. Each bead portion 10 is provided with a bead core 11, and a bead filler 12 is provided on an outer side in the tire radial direction of the bead core 11. The bead core 11 is an annular member formed in an annular shape by bundling bead wires, which are steel wires, and the bead filler 12 is a rubber member disposed on the outer side in the tire radial direction of the bead core 11.

A belt layer 14 is disposed in the tread portion 2. The belt layer 14 is formed by a multilayer structure in which a plurality of belts 141, 142 are layered, and the two layers of the belts 141, 142 are layered in the present first embodiment. The belts 141, 142 constituting the belt layer 14 are formed by rolling and covering, with coating rubber, a plurality of belt cords made of steel or an organic fiber material, such as polyester, rayon, or nylon, and a belt angle defined as an inclination angle of the belt cords with respect to the tire circumferential direction is within a predetermined range (for example, from not less than 20° to not greater than 55°). Furthermore, the belt angles of the two layers of the belts 141, 142 differ from one another. Accordingly, the belt layer 14 is configured as a so-called crossply structure in which the two layers of the belts 141, 142 are layered with the inclination directions of the belt cords intersecting with one another. In other words, the two layers of the belts 141, 142 are provided as so-called cross belts in which the belt cords provided with the respective belts 141, 142 are disposed in mutually intersecting orientations.

A belt cover layer 15 is disposed on the outer side in the tire radial direction of the belt layer 14. The belt cover layer 15 is disposed on the outer side in the tire radial direction of the belt layer 14, covers the belt layer 14 in the tire circumferential direction, and is provided as a reinforcing layer that reinforces the belt layer 14. The belt cover layer 15 is formed by covering, with coating rubber, a plurality of cords (not illustrated) disposed side by side in the tire width direction substantially parallel to the tire circumferential direction. The cords provided with the belt cover layer 15 are made of, for example, steel or an organic fiber, such as polyester, polyethylene terephthalate, rayon, nylon, and a hybrid of a polyamide composite +α, and a cord angle is within a range of ±5° with respect to the tire circumferential direction. Moreover, in the cords provided with the belt cover layer 15, a wire diameter, which is a diameter of the cord, is within a range of from not less than 0.5 mm to not greater than 1.8 mm, and a cord count per 50 mm in an arrangement direction of the cords is within a range of from not less than 30 to not greater than 80. In the present first embodiment, the belt cover layer 15 is disposed across the entire region of the range in the tire width direction in which the belt layer 14 is disposed and covers end portions in the tire width direction of the belt layer 14. The tread rubber layer 4 provided with the tread portion 2 is disposed on the outer side in the tire radial direction of the belt cover layer 15 in the tread portion 2.

A carcass layer 13 containing the cords of radial plies is continuously provided on an inner side in the tire radial direction of the belt layer 14 and on a side of the sidewall portion 8 close to the tire equatorial plane CL. Accordingly, the pneumatic tire 1 according to the present first embodiment is configured as a so-called radial tire. The carcass layer 13 has a single layer structure made of one carcass ply or a multilayer structure made of a plurality of carcass plies, and spans between the pair of bead portions 10 disposed on both sides in the tire width direction in a toroidal shape to form the framework of the tire.

Specifically, the carcass layer 13 is disposed to span from one bead portion 10 to the other bead portion 10 among the pair of bead portions 10 located on both sides in the tire width direction and turns back toward the outer side in the tire width direction along the bead cores 11 at the bead portions 10 so as to wrap around the bead cores 11 and the bead fillers 12. The bead filler 12 is a rubber member disposed in a space formed on the outer side in the tire radial direction of the bead core 11 when the carcass layer 13 is folded back at the bead portion 10. Moreover, the belt layer 14 is disposed on the outer side in the tire radial direction of a portion, located in the tread portion 2, of the carcass layer 13 spanning between the pair of bead portions 10. Moreover, the carcass ply of the carcass layer 13 is made by rolling and covering, with coating rubber, a plurality of carcass cords made from steel or an organic fiber material such as aramid, nylon, polyester, or rayon. The plurality of carcass cords that form the carcass ply are disposed side by side with an angle in the tire circumferential direction, the angle with respect to the tire circumferential direction following a tire meridian direction.

At the bead portion 10, a rim cushion rubber 17 is disposed on an inner side in the tire radial direction and an outer side in the tire width direction of the bead core 11 and a turned back portion of the carcass layer 13, the rim cushion rubber 17 forming a contact surface of the bead portion 10 against the rim flange. Additionally, an innerliner 16 is formed along the carcass layer 13 on the inner side of the carcass layer 13 or on the inner side of the carcass layer 13 in the pneumatic tire 1. The innerliner 16 forms a tire inner surface 18 that is a surface on the inner side of the pneumatic tire 1.

Figure 2:
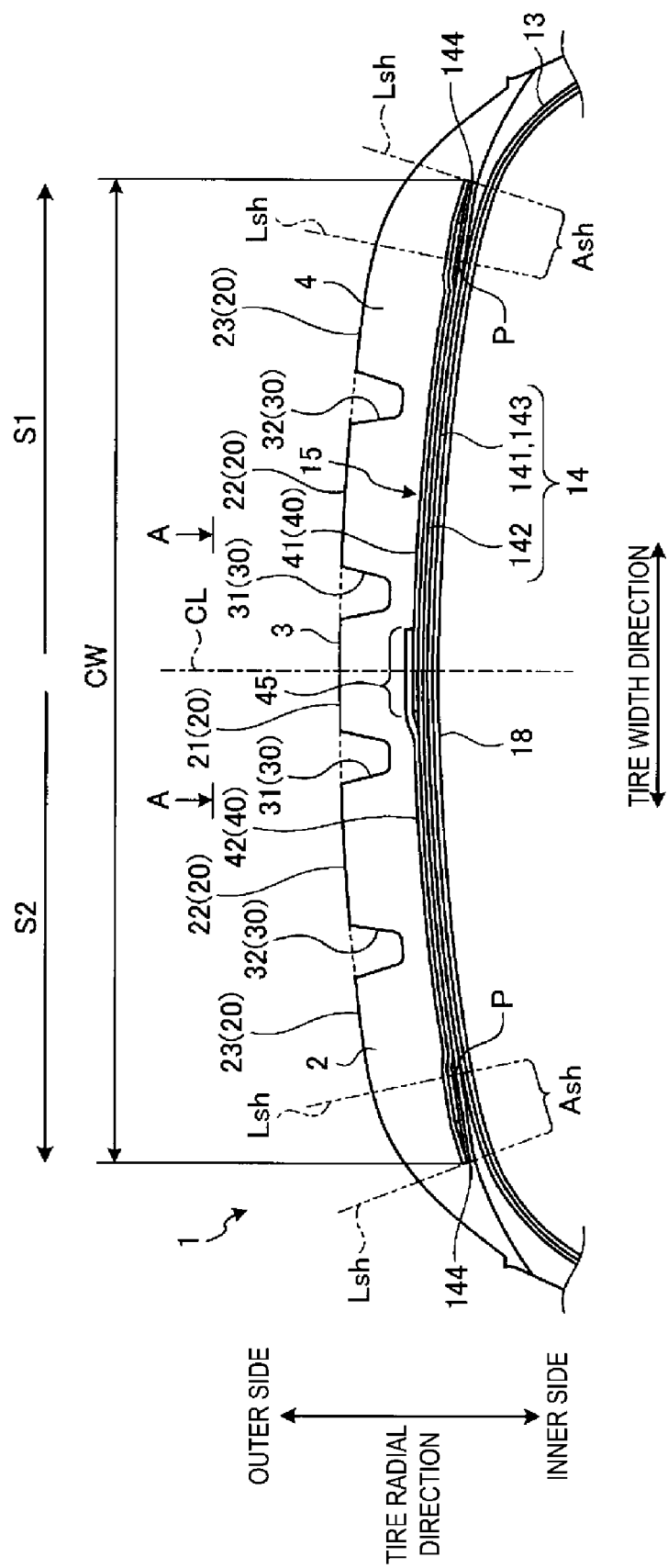
FIG. 2 is a detailed view of a tread portion illustrated in FIG. 1.
Figure 3:
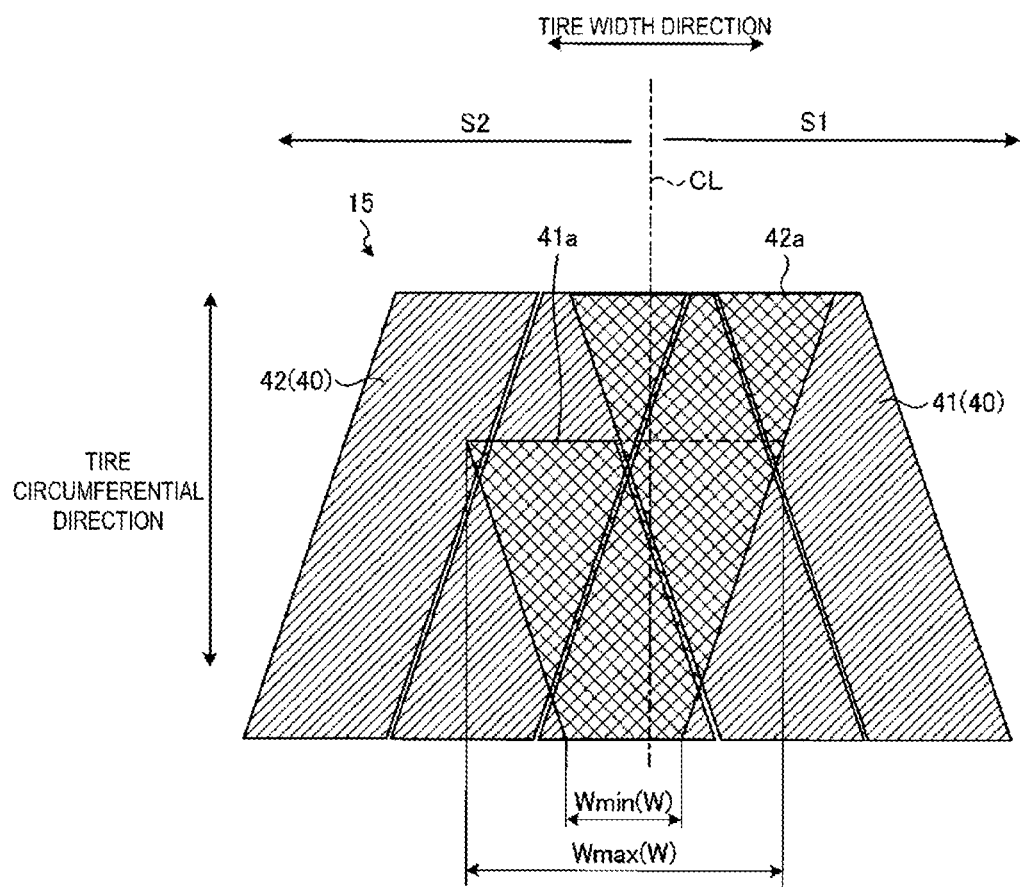
FIG. 3 is a schematic diagram of a belt cover layer in a direction of the arrow A-A in FIG. 2.

FIG. 2 is a detailed view of the tread portion 2 illustrated in FIG. 1. FIG. 3 is a schematic diagram of the belt cover layer 15 in a direction of the arrow A-A in FIG. 2. The belt cover layer 15 disposed on the outer side in the tire radial direction of the belt layer 14 is formed by spirally winding belt cover materials 40, which are band-like members formed in a band shape, on the outer side in the tire radial direction of the belt layer 14 around the tire rotation axis. The belt cover material 40, which is the band-like member, has a width in a range of from not less than 5 mm to not greater than 15 mm. The belt cover materials 40 are reinforcing layer constituent members constituting the belt cover layer 15, and a cord constituting the belt cover layer 15 is formed by being coated with a coating rubber.

The belt cover material 40 includes a first cover material 41 and a second cover material 42. The first cover material 41 and the second cover material 42 are each formed in a band shape, and are each spirally wound on the outer side outer side of the belt layer 14 in the tire radial direction. In addition, the first cover material 41 and the second cover material 42 are members of an identical type and are each formed by coating the cords constituting the belt cover layer 15 with coating rubbers. In other words, the first cover material 41 and the second cover material 42 have a configuration in which, for example, widths and thicknesses, wire diameters of the cords and intervals of the cords, and materials of the cords and the coating rubbers can be regarded as being identical.

Additionally, disposed positions of the first cover material 41 and the second cover material 42 in the tire width direction are disposed at sides opposite to one another with the tire equatorial plane CL as its center, and the first cover material 41 and the second cover material 42 overlap at a position at or near the center in the tire width direction. Specifically, in a case where one side with respect to the tire equatorial plane CL in the tire width direction is defined as a first side S1 and the other side with respect to the tire equatorial plane CL in the tire width direction is defined as a second side S2, the first cover material 41 is disposed from a position between a shoulder region Ash on the second side S2 and the tire equatorial plane CL to the shoulder region Ash on the first side S1. The second cover material 42 is disposed from a position between the shoulder region Ash on the first side S1 and the tire equatorial plane CL to the shoulder region Ash on the second side S2.

Note that the shoulder region Ash in this case is a region between a position P at 85% of the width of the belt layer 14 in the tire width direction and an end portion 144 of the belt layer 14 in the tire width direction. Specifically, in a tire meridian cross-section, the shoulder region Ash is a region positioned between two shoulder region boundary lines Lsh. The shoulder region boundary lines Lsh are respective lines perpendicularly extending from the position P at 85% of the width of a widest belt 143 in the tire width direction, which has the widest width in the tire width direction among the plurality of belts 141, 142 provided with the belt layer 14, and the end portion 144 of the widest belt 143 to the tire inner surface 18. The shoulder regions Ash thus defined are defined on both sides of the tire equatorial plane CL in the tire width direction, and are positioned on respectively both sides of the tire equatorial plane CL in the tire width direction.

In the first present embodiment, of the two layers of the belts 141, 142 included in the belt layer 14, a width of the belt 141 in the tire width direction positioned on the inner side in the tire radial direction is wider than a width of the other belt 142 in the tire width direction, and the belt 141 positioned on the inner side in the tire radial direction is the widest belt 143.

Also, the positions P at 85% of the width of the widest belt 143 in the tire width direction are positions of end portions of a 85% region when a region of 85% of the width of the widest belt 143 in the tire width direction is evenly distributed on both sides in the tire width direction with the center of the widest belt 143 in the tire width direction or the position of the tire equatorial plane CL as the center. Accordingly, intervals between the positions P at 85% of the width of the widest belt 143 in the tire width direction and the end portions 144 of the widest belt 143 are identical sizes between both sides of the tire equatorial plane CL in the tire width direction.

The shoulder region Ash defined in this manner is defined by a shape in a state in which the pneumatic tire 1 is mounted on a regular rim and is inflated to the regular internal pressure. Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, a regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

In addition, the first cover material 41 and the second cover material 42 are each spirally wound on the outer side of the belt layer 14 in the tire radial direction. The direction of the spiral is a direction that is symmetrical when viewed with the tire equatorial plane CL as its center. In other words, the first cover material 41 and the second cover material 42 have the identical winding direction in the tire circumferential direction in heading from the tire equatorial plane CL side to the shoulder region Ash sides. Specifically, the direction of winding of the first cover material 41 in the tire circumferential direction in heading from the tire equatorial plane CL side to the shoulder region Ash side on the first side S1, and the direction of winding of the second cover material 42 in the tire circumferential direction in heading from the tire equatorial plane CL side to the shoulder region Ash side on the second side S2 are the identical direction.

Furthermore, the first cover material 41 and the second cover material 42 have an overlapping portion 45 where the first cover material 41 and the second cover material 42 overlap in the tire radial direction at a position where positions in the tire width direction are identical to one another.

Figure 4:
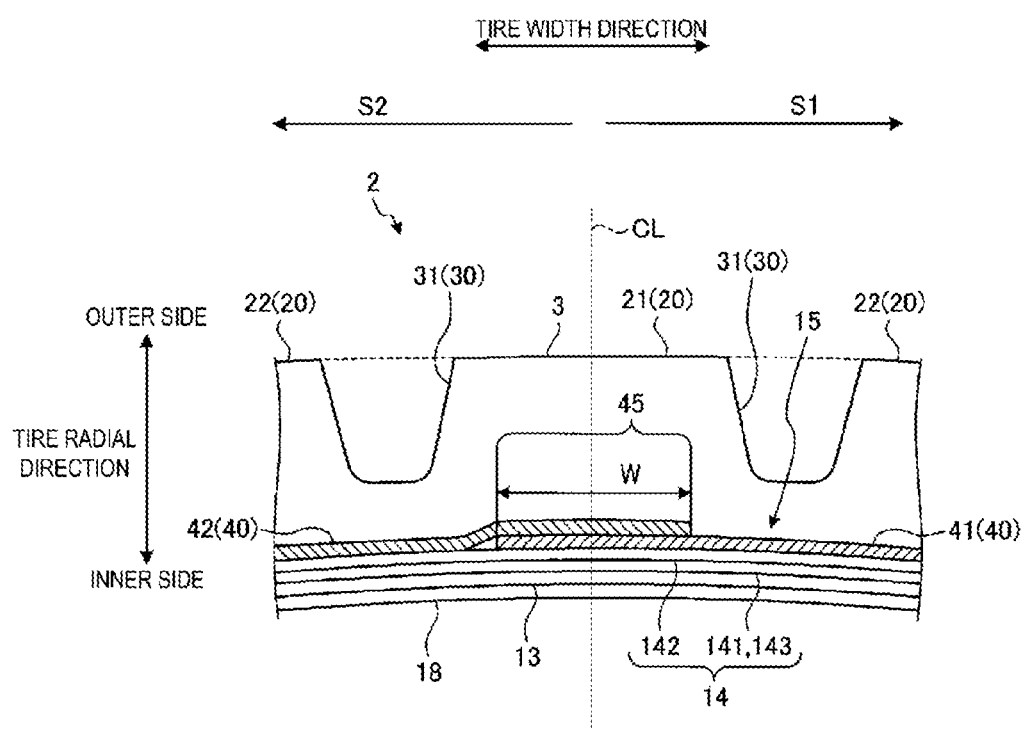
FIG. 4 is a detailed view of a center land portion illustrated in FIG. 2.

FIG. 4 is a detailed view of the center land portion 21 illustrated in FIG. 2. An inner end portion 41a (see FIG. 3) as an end portion close to the tire equatorial plane CL of the first cover material 41 is positioned on the second side S2, and an inner end portion 42a (see FIG. 3) as an end portion close to the tire equatorial plane CL of the second cover material 42 is positioned on the first side S1. The overlapping portion 45 is formed at a position between a portion of the first cover material 41 positioned on the second side S2 and a portion of the second cover material 42 positioned on the first side S1. Thus, the overlapping portion 45 is formed so as to go across the tire equatorial plane CL in the tire width direction, and at least a part of the overlapping portion 45 is positioned on the inner side in the tire radial direction of the center land portion 21. In other words, while the first cover material 41 and the second cover material 42 are wound in one layer at the positions on the inner side in the tire radial direction of the second land portion 22 and the shoulder land portion 23, the two layers of the first cover material 41 and the second cover material 42 are overlappingly wound in the tire radial direction at the position on the inner side in the tire radial direction of the center land portion 21 and the portion where both of the first cover material 41 and the second cover material 42 are disposed.

In other words, since the first cover material 41 and the second cover material 42 are spirally wound without overlapping the belt cover materials 40 in the tire radial direction at the positions on the inner side in the tire radial direction of the second land portion 22 and the shoulder land portion 23, the belt cover material 40 is wound in one layer. In contrast, when the first cover material 41 and the second cover material 42 are each spirally wound at the position on the inner side in the tire radial direction of the center land portion 21 and at the portion where both of the first cover material 41 and the second cover material 42 disposed, both are overlappingly wound in the tire radial direction, and thus the belt cover materials 40 are wound in the two layers. The overlapping portion 45 is a portion where the larger number of belt cover materials 40 is layered compared with that at the position other than the overlapping portion 45 in a range in which the belt cover layer 15 is disposed.

Thus, the first cover material 41 and the second cover material 42 forming the overlapping portion 45 are disposed such that the position of the inner end portion 41a of the first cover material 41 in the tire circumferential direction and the position of the inner end portion 42a of the second cover material 42 in the tire circumferential direction are different positions.

Here, because the first cover material 41 and the second cover material 42 are spirally disposed around the tire rotation axis, both are inclined in the tire width direction with respect to the tire circumferential direction. Furthermore, the position of the inner end portion 41a of the first cover material 41 in the tire circumferential direction differs from the position of the inner end portion 42a of the second cover material 42 in the tire circumferential direction. Thus, the overlapping portion 45 formed by overlapping the first cover material 41 and the second cover material 42 in the tire radial direction has a width W in the tire width direction that varies depending on the position in the tire circumferential direction.

The overlapping portion 45 having the varying width W in the tire width direction has a minimum width Wmin (see FIG. 3), which is a width at a position where the width W in the tire width direction is minimized, of not less than 5 mm, and a maximum width Wmax (see FIG. 3), which is a width at a position where the width W in the tire width direction is maximized, of not greater than 40 mm. In other words, the overlapping portion 45 has the width W in the tire width direction in a range of from not less than 5 mm to not greater than 40 mm.

Method for Manufacturing Pneumatic Tire

Next, the manufacturing method for the pneumatic tire 1 according to the first embodiment will be described. To manufacture the pneumatic tire 1, first, processing is performed on each of the members constituting the pneumatic tire 1, and the processed members are assembled. That is, the rubber members, such as the tread rubber layer 4, and the respective members, such as the bead core 11, the carcass layer 13, the belt layer 14, and the belt cover layer 15 are each processed and the processed members are assembled. Of these, the belt cover layer 15 is disposed on the outer side in the tire radial direction of the belt layer 14 by spirally winding the band-like belt cover materials 40 on the outer side of the belt layer 14 in the tire radial direction around the tire rotation axis.

As the belt cover materials 40, which are the members for forming the belt cover layer 15, the first cover material 41 (see FIG. 3) and the second cover material 42 (see FIG. 3) are used in the present first embodiment. A step of disposing the belt cover layer 15 on the outer side of the belt layer 14 in the tire radial direction includes: a step of spirally winding the first cover material 41 from the position between the shoulder region Ash on the second side S2 (see FIG. 2) and the tire equatorial plane CL to the shoulder region Ash on the first side S1 (see FIG. 2); and a step of spirally winding the second cover material 42 from the position between the shoulder region Ash on the first side S1 and the tire equatorial plane CL to the shoulder region Ash on the second side S2. That is, in the step of winding the first cover material 41, while the inner end portion 41a (see FIG. 3) of the first cover material 41 is positioned on the second side S2, the most part of the first cover material 41 is wound on the first side S1. In the step of winding the second cover material 42, while the inner end portion 42a (see FIG. 3) of the second cover material 42 is positioned on the first side S1, the most part of the second cover material 42 is wound on the second side S2.

The step of winding the first cover material 41 and the step of winding the second cover material 42 are performed with times overlapping with one another. In other words, at least a part of a work in the step of winding the first cover material 41 and at least a part of a work in the step of winding the second cover material 42 in the step of winding the first cover material 41 and the step of winding the second cover material 42 are performed at the identical time.

In addition, the first cover material 41 and the second cover material 42 are each wound such that the position of the inner end portion 41a of the first cover material 41 in the tire circumferential direction and the position of the inner end portion 42a of the second cover material 42 in the tire circumferential direction differ from one another. Thus, while the first cover material 41 and the second cover material 42 are each spirally wound around the tire rotation axis on the outer side in the tire radial direction of the belt layer 14, the first cover material 41 and the second cover material 42 are disposed in the predetermined range, and thus the belt cover layer 15 is disposed on the outer side in the tire radial direction of the belt layer 14.

Also, in the step of winding the first cover material 41 and the step of winding the second cover material 42, the first cover material 41 and the second cover material 42 are overlapped in the tire radial direction at the portion where the positions in the tire width direction are the identical position between the first cover material 41 and the second cover material 42. In other words, in the step of winding the first cover material 41 and the step of winding the second cover material 42, the first cover material 41 and the second cover material 42 overlap in the tire radial direction at the position between the portion of the first cover material 41 positioned on the second side S2 and the portion of the second cover material 42 positioned on the first side S1. As a result, the overlapping portion 45 where the first cover material 41 and the second cover material 42 overlap in the tire radial direction is formed.

At this time, in the step of winding the first cover material 41 and the step of winding the second cover material 42, since both of the first cover material 41 and the second cover material 42 are spirally wound, the first cover material 41 and the second cover material 42 are wound to be inclined in the tire width direction with respect to the tire circumferential direction. In addition, the first cover material 41 and the second cover material 42 are wound such that the position of the inner end portion 41a of the first cover material 41 in the tire circumferential direction and the position of the inner end portion 42a of the second cover material 42 in the tire circumferential direction differ from one another. Accordingly, the overlapping portion 45 is formed in a configuration in which the width W in the tire width direction varies depending on the position in the tire circumferential direction.

Figure 5:
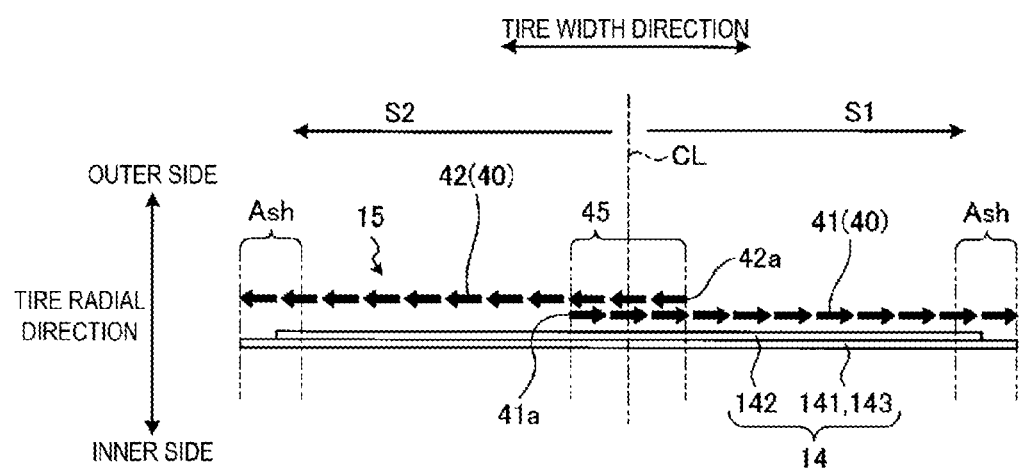
FIG. 5 is a schematic view describing directions in which a first cover material and a second cover material are wound.

FIG. 5 is a schematic view describing directions in which the first cover material 41 and the second cover material 42 are wound. In the step of winding the first cover material 41, the first cover material 41 is spirally wound from the position between the shoulder region Ash on the second side S2 and the tire equatorial plane CL to the shoulder region Ash on the first side S1. Similarly, in the step of winding the second cover material 42, the second cover material 42 is spirally wound from the position between the shoulder region Ash on the first side S1 and the tire equatorial plane CL to the shoulder region Ash on the second side S2. In other words, first, the inner end portion 41a of the first cover material 41 is disposed on the second side S2 and spirally wound to the shoulder region Ash side on the first side S1. Similarly, first, the inner end portion 42a of the second cover material 42 is disposed on the first side S1 and spirally wound to the shoulder region Ash side on the second side S2. In other words, the first cover material 41 and the second cover material 42 are each wound to the outer side in the tire width direction from the position near the tire equatorial plane CL.

Functions and Effects

To mount the pneumatic tire 1 according to the present first embodiment on a vehicle, a rim wheel R (see FIG. 6) is fitted to the bead portion 10 to mount the pneumatic tire 1 on the rim wheel R, and then the inner portion is filled with air, and the rim wheel R is mounted on the vehicle with the pneumatic tire 1 in an inflated state. The orientation when the pneumatic tire 1 is mounted on the vehicle may be such that the first side S1 is on the inner side in the vehicle width direction and the second side S2 is on the outer side in the vehicle width direction, or the first side S1 is on the outer side in the vehicle width direction and the second side S2 is on the inner side in the vehicle width direction. Note that in the pneumatic tire 1 in which the orientation when the pneumatic tire 1 is mounted on a vehicle is designated, the relationship between the inner side and the outer side in a vehicle mounting direction and the first side S1 and the second side S2 may be preset.

The pneumatic tire 1 according to the present first embodiment is, for example, the pneumatic tire 1 that can accommodate use at high loads, such as the pneumatic tire 1 with EXTRA LOAD standard. As such, the pneumatic tire 1 can be used with an air pressure at inflation in a relatively high state. Thus, when the pneumatic tire 1 is used at a high load, the pneumatic tire 1 is used at an increased air pressure. When the vehicle equipped with the pneumatic tires 1 travels, the pneumatic tire 1 rotates with the ground contact surface 3 at a portion positioned on a lower side in the ground contact surface 3 in contact with the road surface. The vehicle travels by transferring a driving force and a braking force to the road surface or generating a turning force due to the friction force between the ground contact surface 3 and the road surface.

For example, in a case where the vehicle on which the pneumatic tires 1 are mounted travels on a dry road surface, the vehicle travels mainly by transmitting a driving force or a braking force to the road surface or generating a turning force by a frictional force between the ground contact surface 3 and the road surface. When the vehicle travels on a wet road surface, the vehicle travels in such a way that water between the ground contact surface 3 and the road surface enters grooves, such as the main grooves 30 and the lug grooves, and the water between the ground contact surface 3 and the road surface is drained through these grooves. Accordingly, the ground contact surface 3 is easily grounded on the road surface, and the frictional force between the ground contact surface 3 and the road surface allows the vehicle to travel as desired.

Additionally, while the vehicle is traveling, the pneumatic tire 1 is subjected to a load associated with a weight of a vehicle body, acceleration/deceleration, and turning. Accordingly, a large load acts in the tire radial direction. This load is mainly received by air filled into the pneumatic tire 1, but is also received by the tread portion 2 and the sidewall portion 8 as well as the air inside the pneumatic tire 1. That is, the sidewall portion 8 transmits the load between the bead portion 10 to which the rim wheel R is fitted and the tread portion 2, and the tread portion 2 transmits the load between the sidewall portion 8 and the road surface. Accordingly, the large load acts on the sidewall portion 8 and the tread portion 2 while the vehicle is traveling, and the sidewall portion 8 and the tread portion 2 receive this load while deflecting mainly in the tire radial direction.

Additionally, while the vehicle is traveling, the pneumatic tire 1 rotates, so the position in the ground contact surface 3 that comes into contact with the road surface continuously moves in the tire circumferential direction. In accordance with this, the positions in the sidewall portion 8 and the tread portion 2 deflecting by the load while the vehicle is traveling also move in the tire circumferential direction. Thus, while the vehicle is traveling, the pneumatic tire 1 rotates while repeating the sequential deflection of the respective positions of the sidewall portion 8 and the tread portion 2 on the tire circumferential direction.

Additionally, a projection projecting from a road surface, such as a stone, is possibly present on a road surface on which the vehicle travels, and the vehicle during traveling possibly treads such a projection by the tread portion 2 of the pneumatic tire 1. At this time, when the sidewall portion 8 and the tread portion 2 have a small deflection due to the high air pressure filled in the pneumatic tire 1, the pneumatic tire 1 cannot absorb the change in the shape of the road surface due to the presence of the projection, and the projection possibly penetrates the tread portion 2 of the pneumatic tire 1. That is, in the pneumatic tire 1 with the increased internal pressure, when the projection on the road surface is trodden, the small deflection of the sidewall portion 8 and the tread portion 2 causes the projection to penetrate the tread portion 2, possibly causing a shock burst.

Figure 6:
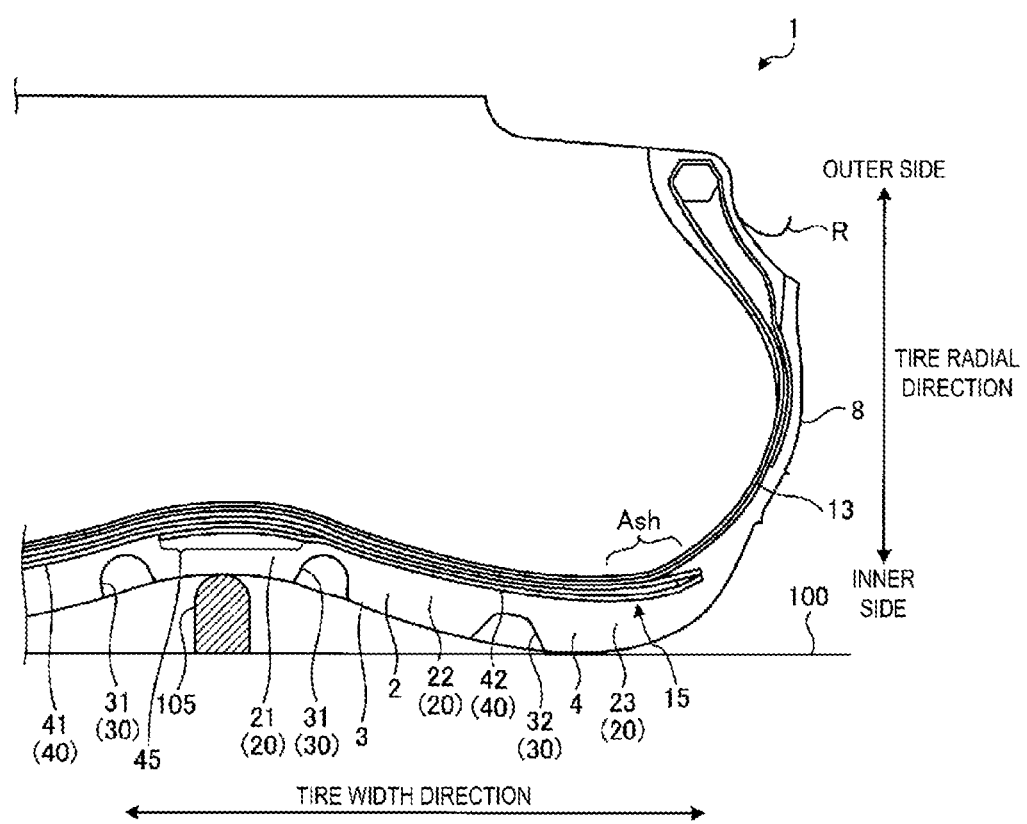
FIG. 6 is an explanatory diagram illustrating a state in which a projection on a road surface is trodden by the pneumatic tire according to the first embodiment.

In contrast, with the pneumatic tire 1 according to the present first embodiment, the belt cover layer 15 is formed by the first cover material 41 and the second cover material 42, and the first cover material 41 and the second cover material 42 form the overlapping portion 45 that goes across the tire equatorial plane CL in the tire width direction, and thus a shock burst in a case where an internal pressure is increased can be suppressed. FIG. 6 is an explanatory diagram illustrating a state in which a projection 105 on a road surface 100 is trodden by the pneumatic tire 1 according to the first embodiment. In the pneumatic tire 1 according to the first embodiment, by overlapping the portions of the first cover material 41 and the second cover material 42 going across the tire equatorial plane CL in the tire width direction in the tire radial direction, the overlapping portion 45 where the belt cover materials 40 are the two layers can be formed at the position of going across the tire equatorial plane CL. This allows increasing a strength at break at or near the center in the tire width direction of the tread portion 2. Even when the projection 105 on the road surface 100 is trodden at or near the center land portion 21 where a ground contact pressure is likely to increase, the penetration of the projection 105 through the tread portion 2 can be suppressed. Accordingly, shock bursts caused by the projection 105 being trodden during traveling of the vehicle can be suppressed.

In addition, the first cover material 41 and the second cover material 42 forming the belt cover layer 15 are disposed at the different positions in the tire width direction except for the portion of the overlapping portion 45. Accordingly, the first cover material 41 and the second cover material 42 can be disposed by simultaneously spirally winding the portions other than the overlapping portion 45. As a result, when the belt cover layer 15 is disposed for the purpose of improving shock burst resistance performance, the disposition can be performed with increased productivity. As a result, productivity can be improved while a decrease in shock burst resistance performance is suppressed.

In addition, because the overlapping portion 45 is formed continuously from the first cover material 41 and the second cover material 42, separation at or near the end portion of the belt cover material 40 from the tread rubber layer 4 can be reduced. That is, when the belt cover materials 40 forming the overlapping portion 45 are discontinuous with the belt cover materials 40 forming the other portion in the belt cover layer 15, both end portions of the belt cover materials 40 forming the overlapping portion 45 are positioned on the outer side in the tire radial direction of the portions other than the overlapping portion 45 in the belt cover layer 15. In this case, repetitive variation of a load acting on the overlapping portion 45 along with the traveling of the vehicle possibly makes it easy for separation at or near both end portions of the belt cover materials 40 forming the overlapping portion 45 to occur. In other words, the vicinities of both end portions of the belt cover materials 40 forming the overlapping portion 45 are possibly likely to be separated from the tread rubber layer 4.

In contrast, when the overlapping portion 45 is formed continuously from the first cover material 41 and the second cover material 42, the end portions of the belt cover materials 40 forming the overlapping portion 45 exposed to the tread rubber layer 4 are reduced, so it is possible to reduce the separation of the vicinities of the end portions of the belt cover materials 40 from the tread rubber layer 4. As a result, it is possible to improve shock burst resistance performance while suppressing edge separation of the overlapping portion 45.

Additionally, the overlapping portion 45 has the minimum width Wmin of the width W in the tire width direction of not less than 5 mm, and the maximum width Wmax of the width W in the tire width direction of not greater than 40 mm, so it is possible to more reliably ensure a strength of the overlapping portion 45 while suppressing an excessive increase in the weight of the belt cover layer 15. In other words, when the minimum width Wmin of the overlapping portion 45 is less than 5 mm, the minimum width Wmin is excessively small, which possibly makes it difficult to ensure the strength of the overlapping portion 45. In this case, even when the overlapping portion 45 is formed, effectively improving the strength at break at or near the center of the tread portion 2 in the tire width direction is difficult, and this possibly makes it difficult to effectively suppress the penetration of the projection 105 trodden by the tread portion 2 through the tread portion 2. When the maximum width Wmax of the overlapping portion 45 is greater than 40 mm, the maximum width Wmax is excessively large, so there is a possibility that the belt cover material 40 used becomes excessively large. In this case, the weight of the belt cover layer 15 possibly excessively increases, and the weight of the pneumatic tire 1 possibly excessively increases caused by the provision of the overlapping portion 45.

In contrast, when the minimum width Wmin of the overlapping portion 45 is not less than 5 mm and the maximum width Wmax is not greater than 40 mm, while the excessive increase in the weight of the belt cover layer 15 is suppressed, the strength of the overlapping portion 45 can be more reliably ensured, and the strength at break at or near the center of the tread portion 2 in the tire width direction where a ground contact pressure is likely to increase can be more reliably improved. As a result, while the increase in the weight of the pneumatic tire 1 is suppressed, shock burst resistance performance can be improved.

Since the first cover material 41 and the second cover material 42 are the identical type, the strengths of the portions of the belt cover layer 15 other than the overlapping portion 45 can be made uniform using the first cover material 41 and the second cover material 42 as the members constituting the belt cover layer 15. As a result, a shock burst can be suppressed while an influence on another performance, such as steering stability, is suppressed. By using the first cover material 41 and the second cover material 42 of the identical type, the production of the first cover material 41 and the second cover material 42 can be performed simultaneously or continuously, and the productivity when using the first cover material 41 and the second cover material 42 as the belt cover materials 40 can be improved. As a result, productivity can be improved while a decrease in shock burst resistance performance is suppressed more reliably.

The method for manufacturing the pneumatic tire 1 according to the first embodiment includes: using the first cover material 41 and the second cover material 42 as the belt cover materials 40, the step of spirally winding the first cover material 41 from the position between the shoulder region Ash on the second side S2 and the tire equatorial plane CL to the shoulder region Ash on the first side S1; and the step of spirally winding the second cover material 42 from the position between the shoulder region Ash on the first side S1 and the tire equatorial plane CL to the shoulder region Ash on the second side S2. Accordingly, the first cover material 41 and the second cover material 42 can be wound simultaneously. This allows the shortening of the time taken for disposing the belt cover layer 15, thereby ensuring enhanced productivity.

Also, in the step of winding the first cover material 41 and the step of winding the second cover material 42, both are overlapped at the portion where the positions in the tire width direction become the identical position between the first cover material 41 and the second cover material 42 to form the overlapping portion 45. Accordingly, the strength at break at or near the center of the tread portion 2 in the tire width direction where ground contact pressure is likely to increase can be increased. As a result, even when the projection 105 on the road surface 100 is trodden by the vicinity of the center land portion 21, the penetration of the projection 105 through the tread portion 2 can be suppressed, and a shock burst caused by the tread of the projection 105 during traveling of the vehicle can be suppressed. As a result, productivity can be improved while a decrease in shock burst resistance performance is suppressed.

The step of winding the first cover material 41 spirally winds the first cover material 41 from the position between the shoulder region Ash on the second side S2 and the tire equatorial plane CL to the shoulder region Ash on the first side S1, and the step of winding the second cover material 42 spirally winds the second cover material 42 from the position between the shoulder region Ash on the first side S1 and the tire equatorial plane CL to the shoulder region Ash on the second side S2. Accordingly, when the first cover material 41 and the second cover material 42 are wound, each of the first cover material 41 and the second cover material 42 can be wound from the position close to the tire equatorial plane CL to the outer side in the tire width direction. As a result, the winding positions of the first cover material 41 and the second cover material 42 can be wound in directions away from one another in the tire width direction, so it is possible to more reliably suppress an interference between devices used to wind the first cover material 41 and the second cover material 42. Thus, productivity can be more reliably improved.

Second Embodiment

The pneumatic tire 1 according to the second embodiment has a configuration substantially similar to that of the pneumatic tire 1 according to the first embodiment, but has a feature that the belt cover materials 40 are folded back. Because the other configurations are identical to those of the first embodiment, descriptions thereof will be omitted and the identical reference numerals are used.

Figure 7:
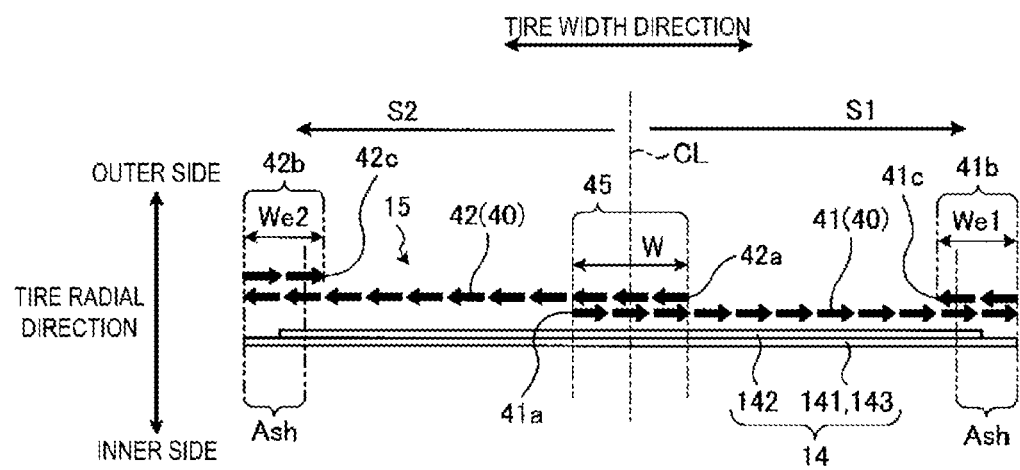
FIG. 7 is a schematic view of a first cover material and a second cover material of a pneumatic tire according to a second embodiment.

FIG. 7 is a schematic view of the first cover material 41 and the second cover material 42 of the pneumatic tire according to the second embodiment. In the pneumatic tire 1 according to the second embodiment, similarly to the pneumatic tire 1 according to the first embodiment, the belt cover layer 15 is formed by spirally winding the first cover material 41 and the second cover material 42 on the outer side of the belt layer 14 in the tire radial direction, and the first cover material 41 and the second cover material 42 form the overlapping portion 45 that goes across the tire equatorial plane CL in the tire width direction.

Furthermore, in the second embodiment, the belt cover materials 40 are folded back in the tire radial direction at the shoulder regions Ash. In other words, the step of winding the first cover material 41 spirally winds the first cover material 41 from the inner end portion 41a positioned on the second side S2 to the shoulder region Ash on the first side S1, and is folded back to the outer side in the tire radial direction at the shoulder region Ash on the first side S1. A folded back portion 41b as a portion folded back to the outer side in the tire radial direction is spirally wound on the outer side in the tire radial direction further than a portion of the belt layer 14 in the first cover material 41 wound on the outer side in the tire radial direction from a position folded back at the shoulder region Ash to the tire equatorial plane CL.

Similarly to the second cover material 42, the step of winding the second cover material 42 spirally winds the second cover material 42 from the inner end portion 42a positioned on the first side S1 to the shoulder region Ash on the second side S2, and is folded back to the outer side in the tire radial direction at the shoulder region Ash on the second side S2. A folded back portion 42b as a portion folded back to the outer side in the tire radial direction is spirally wound on the outer side in the tire radial direction further than a portion of the belt layer 14 in the second cover material 42 wound on the outer side in the tire radial direction from a position folded back at the shoulder region Ash to the tire equatorial plane CL.

Note that the folded back portion 41b of the first cover material 41 and the folded back portion 42b of the second cover material 42 may be positioned only in the shoulder regions Ash, or may have portions positioned on the inner side in the tire width direction than the shoulder regions Ash. In other words, an outer end portion 41c, which is an end portion on the folded back portion 41b side of the first cover material 41, and an outer end portion 42c, which is an end portion on the folded back portion 42b side of the second cover material 42, may be positioned in the shoulder regions Ash, or may be positioned on the inner sides in the tire width direction than the shoulder regions Ash.

Thus, the belt cover materials 40 folded back at the shoulder regions Ash have a width in the tire width direction of the portions overlapping in the tire radial direction within a range of from not less than 5% to not greater than 50% of a width CW in the tire width direction of the belt cover layer 15. The width in the tire width direction of the portions overlapping in the tire radial direction in this case is a total width of adding all of a width We1 of the folded back portion 41b of the first cover material 41 in the tire width direction, a width We2 of the folded back portion 42b of the second cover material 42 in the tire width direction, and the width W of the overlapping portion 45 in the tire width direction.

Similarly to the pneumatic tire 1 according to the first embodiment, in the pneumatic tire 1 according to the second embodiment thus configured, the belt cover layer 15 is formed by spirally winding the first cover material 41 and the second cover material 42 on the outer side in the tire radial direction of the belt layer 14, and the first cover material 41 and the second cover material 42 form the overlapping portion 45. Thus, while a decrease in shock burst resistance performance is suppressed, productivity can be improved.

In addition, since the belt cover materials 40 are folded back in the tire radial direction at the shoulder regions Ash, a force that the belt cover layer 15 constrains in the vicinity of the end portions in the tire width direction of the belt layer 14 can be increased. As a result, while the vehicle is traveling, the belt cover layer 15 can more reliably suppress an expansion of the end portions of the belt layer 14 in the tire width direction to the outer side in the tire radial direction. Accordingly, a ground contact length on both sides in the tire width direction in a contact patch shape when the ground contact surface 3 contacts a ground can be shortened. In other words, by folding back the belt cover materials 40 in the tire radial direction at the shoulder regions Ash, the contact patch shape can be adjusted, and the performance during traveling, such as steering stability, can be made to the desired performance. As a result, the desired traveling performance can be ensured while a decrease in shock burst resistance performance is suppressed.

In addition, since the width in the tire width direction of the portions of the belt cover materials 40 overlapping in the tire radial direction is within the range of from not less than 5% to not greater than 50% of the width CW of the belt cover layer 15 in the tire width direction, it is possible to more reliably ensure the strength of the overlapping portion 45 and the constraining force at or near the end portions of the belt layer 14 by the belt cover layer 15 while suppressing the excessive increase in the weight of the belt cover layer 15. In other words, in a case where the width in the tire width direction of the portions overlapping in the tire radial direction of the belt cover materials 40 is less than 5% of the width CW of the belt cover layer 15, because the width of the portions overlapping in the tire radial direction is excessively narrow, the strength of the overlapping portion 45 is possibly difficult to be ensured, and the constraining force at or near the end portions of the belt layer 14 by the belt cover layer 15 is possibly difficult to be ensured. In this case, the strength at break at or near the center of the tread portion 2 in the tire width direction is less likely to be effectively improved by the overlapping portion 45, and the ground contact lengths of both sides in the tire width direction in the contact patch shape are possibly less likely to be effectively shortened. When the width in the tire width direction of the portions of the belt cover materials 40 overlapping in the tire radial direction is greater than 50% of the width CW of the belt cover layer 15, the width of the portions overlapping in the tire radial direction is excessively large, which possibly causes the excessive increase in the weight of the belt cover layer 15. In this case, providing the overlapping portion 45 and folding back the belt cover materials 40 possibly result in excessive increase in the weight of the pneumatic tire 1.

In contrast, when the width in the tire width direction of the portions of the belt cover materials 40 overlapping in the tire radial direction is within a range of from not less than 5% to not greater than 50% of the width CW of the belt cover layer 15, it is possible to more reliably ensure the strength of the overlapping portion 45 and the constraining force at or near the end portions of the belt layer 14 by the belt cover layer 15 while suppressing the excessive increase in the weight of the belt cover layer 15. As a result, while the increase in the weight of the pneumatic tire 1 is suppressed, shock burst resistance performance and running performance can be improved.

Third Embodiment

The pneumatic tire 1 according to the third embodiment has a configuration substantially similar to that of the pneumatic tire 1 according to the first embodiment, but has a feature that portions of the belt cover materials 40 adjacent in the tire width direction overlap in the tire radial direction. Because the other configurations are identical to those of the first embodiment, descriptions thereof will be omitted and the identical reference numerals are used.

Figure 8:
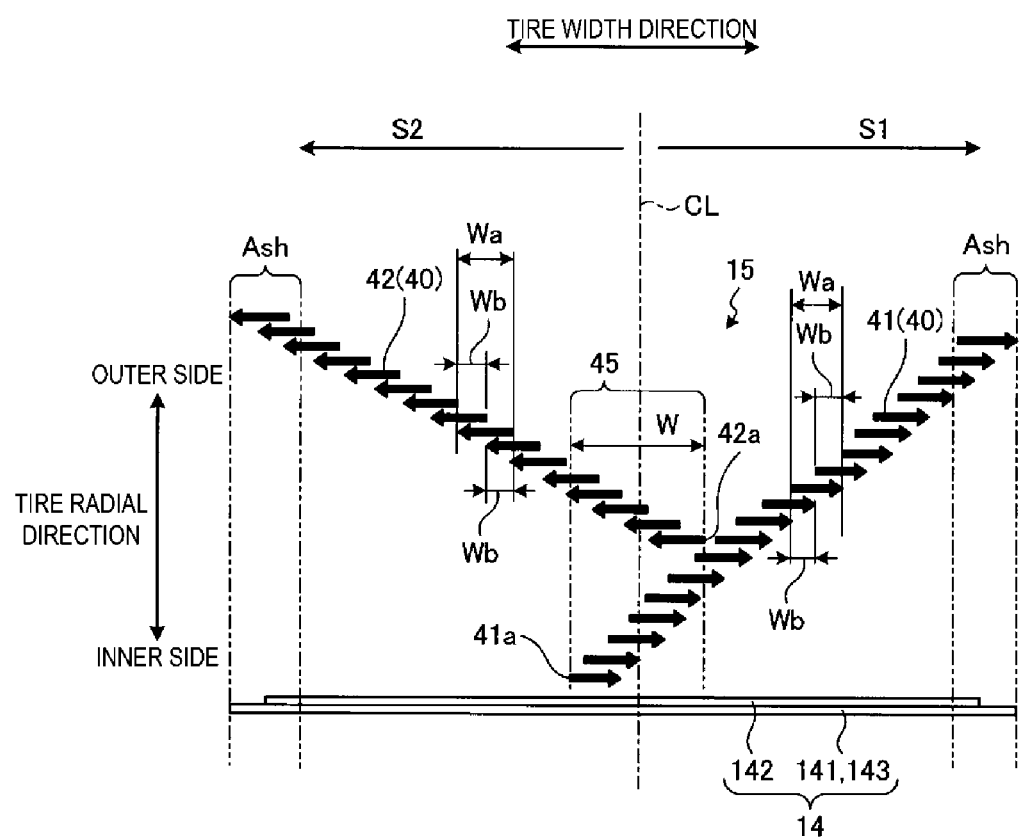
FIG. 8 is a schematic view of belt cover materials included in a pneumatic tire according to a third embodiment.
Figure 9:
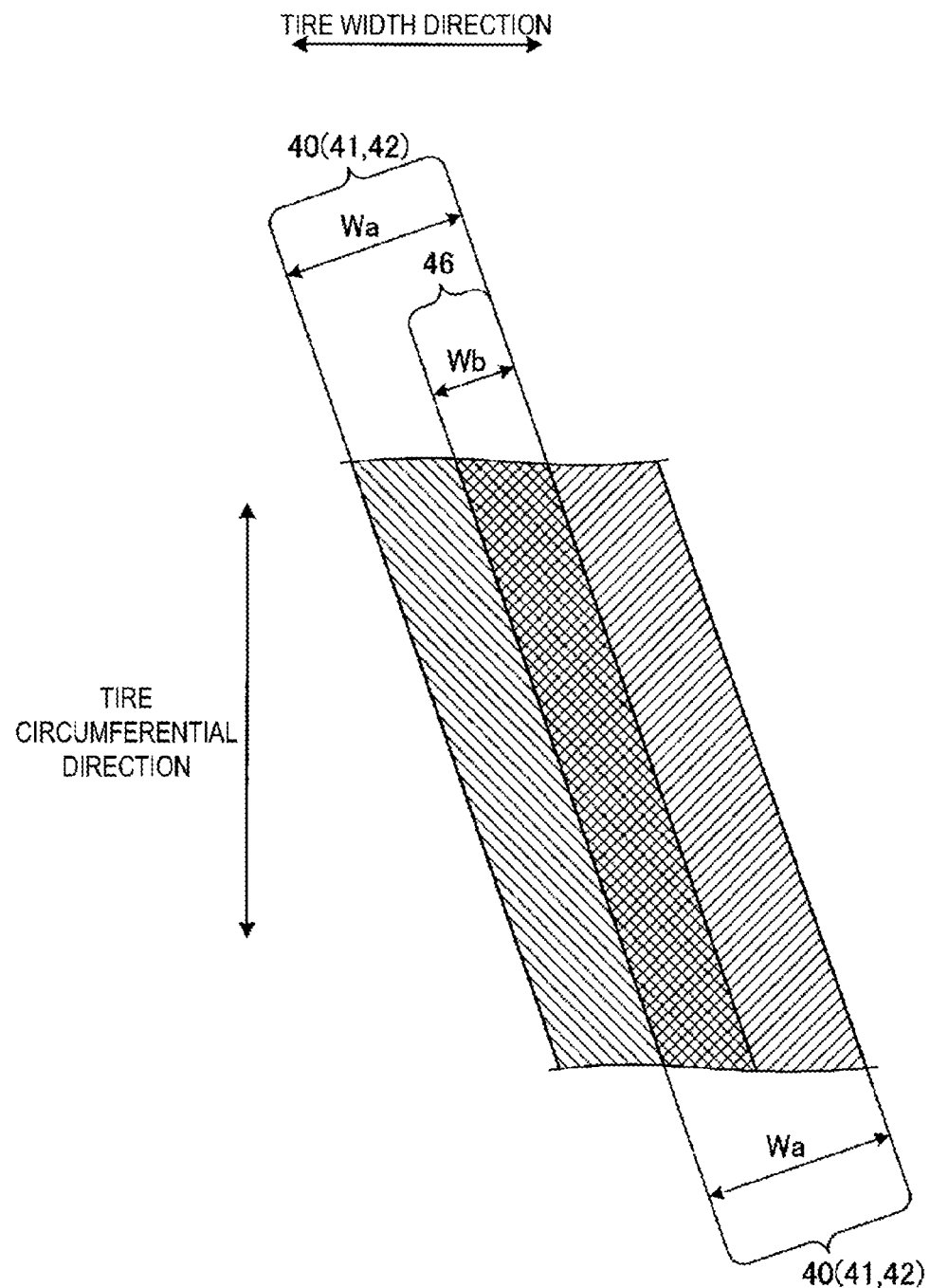
FIG. 9 is a plan view of the belt cover material illustrated in FIG. 8.

FIG. 8 is a schematic view of the belt cover materials 40 included in the pneumatic tire 1 according to the third embodiment. FIG. 9 is a plan view of the belt cover material 40 illustrated in FIG. 8. Similarly to the pneumatic tire 1 according to the first embodiment, in the pneumatic tire 1 according to the third embodiment, the belt cover layer 15 is formed by spirally winding the first cover material 41 and the second cover material 42 on the outer side in the tire radial direction of the belt layer 14, and the first cover material 41 and the second cover material 42 form the overlapping portion 45 that goes across the tire equatorial plane CL in the tire width direction.

Furthermore, in the third embodiment, the belt cover material 40 includes adjacent wrap portions 46 where portions adjacent in the tire width direction overlap in the tire radial direction by spiral winding. In other words, in the first embodiment, the spirally wound belt cover material 40 is spirally wound while the portions adjacent in the tire width direction are aligned in the tire width direction without the portions adjacent in the tire width direction of one belt cover material 40 overlapping in the tire radial direction.

In contrast, in the third embodiment, in the spirally wound belt cover material 40, the portions adjacent in the tire width direction of one belt cover material 40 are spirally wound while overlapped in the tire radial direction. Thus, the portions overlapped in the tire radial direction are formed as the adjacent wrap portions 46. In the third embodiment, the belt cover materials 40 of both of the first cover material 41 and the second cover material 42 are spirally wound with the adjacent wrap portions 46. The adjacent wrap portion 46 thus formed has a width Wb in the width direction of the belt cover material 40 in a range of from not less than 20% to not greater than 70% of a width Wa of the belt cover material 40.

In addition, the overlapping portion 45 has a portion where the belt cover materials 40 are three or more layers by spirally winding the belt cover materials 40 with the adjacent wrap portions 46. In other words, the overlapping portion 45 is formed by overlapping the first cover material 41 and the second cover material 42 in the tire radial direction. Meanwhile, when the portions of the first cover material 41 and the second cover material 42 forming the overlapping portion 45 include the adjacent wrap portions 46, the belt cover materials 40 are three or more layers at the positions of the adjacent wrap portions 46. For example, in a case where the adjacent wrap portion 46 is provided at the portion where the overlapping portion 45 is formed in the first cover material 41, the three layers of the belt cover materials 40, which are the two layers of the first cover materials 41 and one layer of the second cover material 42 forming the adjacent wrap portions 46, are layered in the overlapping portion 45. The same applies to a case in which the adjacent wrap portion 46 is provided at the portion of the second cover material 42 where the overlapping portion 45 is formed.

In addition, in a case where both of portions of the first cover material 41 where the overlapping portion 45 is formed and the portion of the second cover material 42 where the overlapping portion 45 is formed have the adjacent wrap portions 46 and the adjacent wrap portion 46 of the first cover material 41 and the adjacent wrap portion 46 of the second cover material 42 overlap in the tire radial direction, the belt cover materials 40 are layered in four layers. By thus providing the adjacent wrap portion 46 at at least one of the first cover material 41 or the second cover material 42, the overlapping portion 45 has the portion where the belt cover materials 40 are in three or more layers.

Similarly to the pneumatic tire 1 according to the first embodiment, in the pneumatic tire 1 according to the third embodiment thus configured, the first cover material 41 and the second cover material 42 form the overlapping portion 45 in the belt cover layer 15. Thus, while a decrease in shock burst resistance performance is suppressed, productivity can be improved.

Also, since the belt cover materials 40 are spirally wound with the adjacent wrap portion 46, the belt cover layer 15 can be disposed with further high strength. As a result, the strength at break of the tread portion 2 can be increased to a wider range by the belt cover layer 15, and a shock burst can be more reliably suppressed. In addition, the width Wb of the adjacent wrap portion 46 in the width direction of the belt cover material 40 is within a range of from not less than 20% to not greater than 70% of the width Wa of the belt cover material 40. Accordingly, a shock burst can be more reliably suppressed while the excessive increase in the weight of the belt cover layer 15 is suppressed.

In other words, when the width Wb of the adjacent wrap portion 46 is less than 20% of the width Wa of the belt cover material 40, even when the adjacent wrap portion 46 is provided and the belt cover materials 40 are wound, effectively increasing the strength at break of the tread portion 2 is possibly difficult compared with a case of not providing the adjacent wrap portion 46. In this case, even when the adjacent wrap portion 46 is provided, the effect of suppressing a shock burst by providing the adjacent wrap portion 46 is possibly difficult to be obtained. In addition, when the width Wb of the adjacent wrap portion 46 is greater than 70% of the width Wa of the belt cover material 40, the width Wb of the adjacent wrap portion 46 is excessively large, which possibly causes the belt cover material 40 used to be excessively large. In this case, the weight of the belt cover layer 15 is possibly excessively increased, which possibly causes the excessive increase in the weight of the pneumatic tire 1.

In contrast, when the width Wb of the adjacent wrap portion 46 is within a range of from not less than 20% to not greater than 70% of the width Wa of the belt cover material 40, while the excessive increase in the weight of the belt cover layer 15 is suppressed, the strength at break of the tread portion 2 in the tire width direction can be increased to a wider range and a shock burst can be more reliably suppressed. As a result, while the increase in the weight of the pneumatic tire 1 is suppressed, shock burst resistance performance can be improved.

In addition, at least one of the first cover material 41 or the second cover material 42 includes the adjacent wrap portion 46 in the overlapping portion 45 so as to provide the portion where the belt cover materials 40 are three or more layers. Thus, the strength of the overlapping portion 45 can be more reliably ensured. This allows more reliably increasing the strength at break at or near the center of the tread portion 2 in the tire width direction, and allows suppressing a shock burst more reliably. As a result, it is possible to improve shock burst resistance performance more reliably.

Method for Manufacturing Pneumatic Tire and Effects

In the third embodiment as well, the first cover material 41 and the second cover material 42 are each wound to the outer side in the tire width direction from the position near the tire equatorial plane CL. In other words, first, in the first cover material 41, the inner end portion 41a is disposed on the second side S2, and while the adjacent wrap portion 46 is formed, the first cover material 41 is spirally wound to the shoulder region Ash side on the first side S1. Similarly, first, in the second cover material 42, the inner end portion 42a is disposed on the first side S1 and while the adjacent wrap portion 46 is formed, the second cover material 42 is spirally wound to the shoulder region Ash side on the second side S2.

In the case where the belt cover materials 40 are spirally wound while the adjacent wrap portions 46 are provided as well, the first cover material 41 and the second cover material 42 are each thus wound from the position near the tire equatorial plane CL to the outer side in the tire width direction, and thus the inner end portion 41a of the first cover material 41 and the inner end portion 42a of the second cover material 42 can be covered with another portion of the belt cover material 40. As a result, the inner end portion 41a of the first cover material 41 and the inner end portion 42a of the second cover material 42, which are positioned at or near the center in the tire width direction of the tread portion 2 where a large load is likely to repeatedly act, can be disposed away from the tread rubber layer 4. As a result, the edge separation caused by stress concentration at a contact portion between the inner end portion 41a of the first cover material 41 and the inner end portion 42a of the second cover material 42 and the tread rubber layer 4 can be reduced. As a result, it is possible to improve shock burst resistance performance while suppressing the edge separation of the overlapping portion 45.

Modified Examples

In the above-described first embodiment, the four main grooves 30 are formed, but the number of main grooves 30 may be other than four. In the first embodiment described above, although the center land portion 21 is positioned on the tire equatorial plane CL, the land portion 20 needs not to be positioned on the tire equatorial plane CL. For example, the main groove 30 may be positioned on the tire equatorial plane CL. When the main groove 30 is positioned on the tire equatorial plane CL, at least a part of the overlapping portion 45 of the belt cover layer 15 is preferably positioned on the inner side in the tire radial direction of the land portion 20 closest to the tire equatorial plane CL among the plurality of land portions 20.

Figure 10:
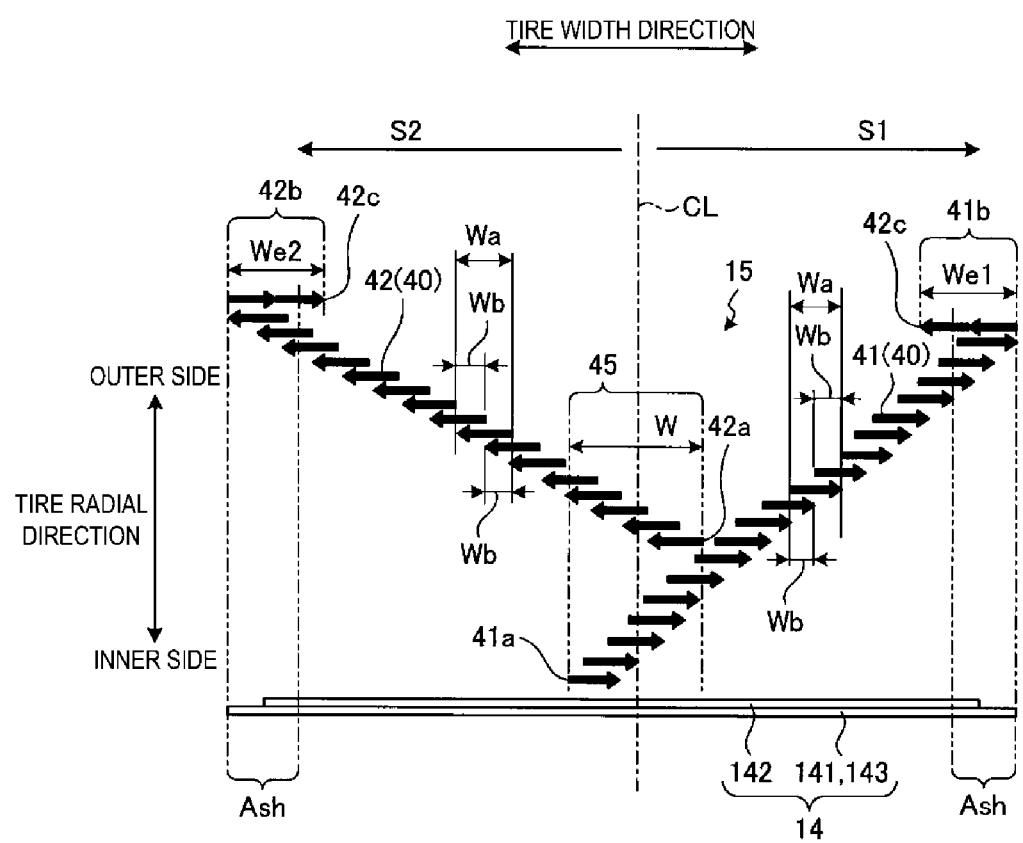
FIG. 10 is a modified example of the third embodiment, and is an explanatory diagram in a case where the belt cover material is folded back at shoulder regions.

Also, in the case where the belt cover materials 40 are spirally wound while the adjacent wrap portions 46 are provided as in the third embodiment, the belt cover materials 40 may be folded back in the tire radial direction at the shoulder regions Ash as in the second embodiment. FIG. 10 is a modified example of the third embodiment, and is an explanatory diagram in a case where the belt cover materials 40 are folded back at the shoulder regions Ash. As illustrated in FIG. 10, the first cover material 41 and the second cover material 42 may be each spirally wound from the position near the tire equatorial plane CL to the outer side in the tire width direction while the adjacent wrap portions 46 (see FIG. 9) are provided and may be folded back in the tire radial direction at the shoulder regions Ash. As a result, while the strength at break of the tread portion 2 can be increased to a wider range by the belt cover layer 15, the contact patch shape can be adjusted, and the performance during traveling, such as steering stability, can be the desired performance. As a result, while the decrease in shock burst resistance performance is more reliably suppressed, desired traveling performance can be ensured.

Figure 11:
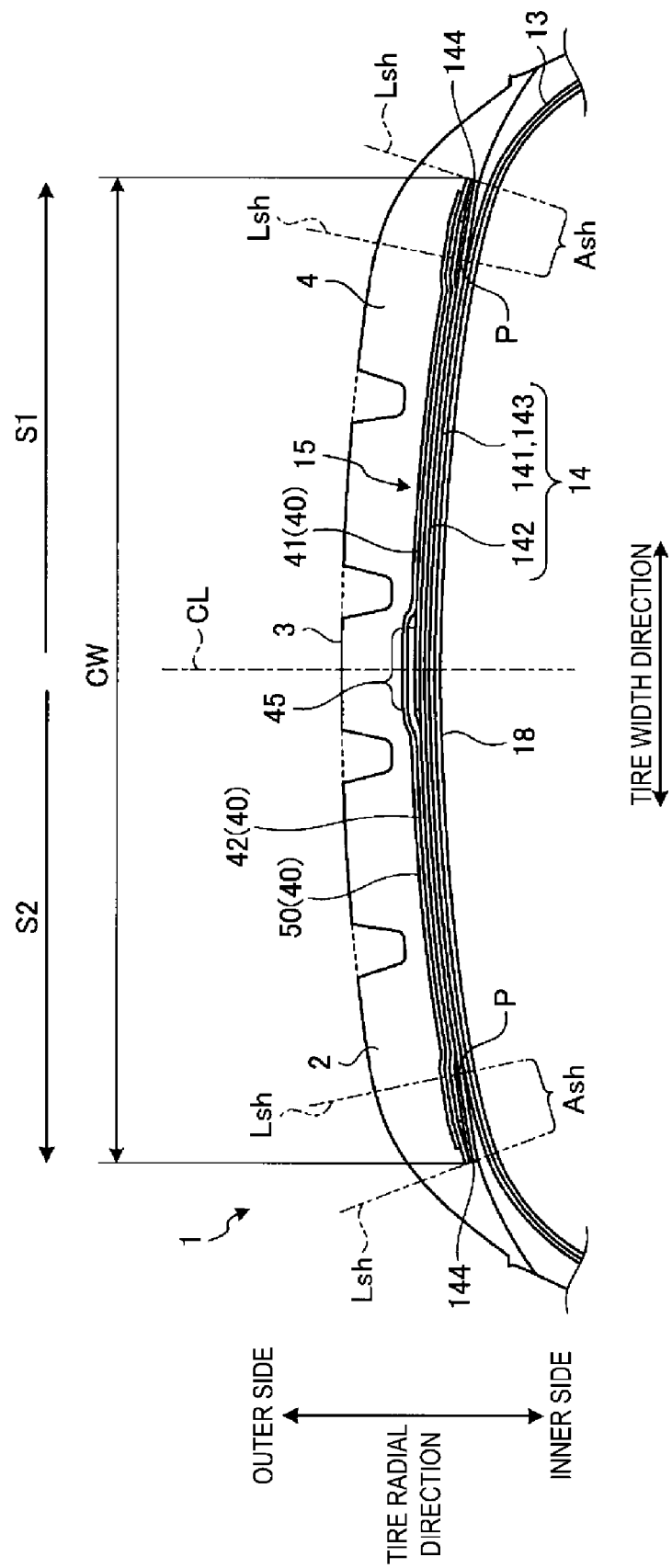
FIG. 11 is a modified example of the first embodiment, and is an explanatory diagram in a case where a full cover is provided outside an overlapping portion.

Additionally, in the first embodiment described above, the portion of the belt cover material 40 forming the overlapping portion 45 is in direct contact with the tread rubber layer 4, but the portion of the belt cover material 40 forming the overlapping portion 45 may be not in contact with the tread rubber layer 4. FIG. 11 is a modified example of the first embodiment, and is an explanatory diagram in a case where a full cover 50 is provided outside the overlapping portion 45. For example, as illustrated in FIG. 11, the full cover 50 disposed between the shoulder regions Ash on both sides in the tire width direction may be disposed on the outer side in the tire radial direction of the first cover material 41 and the second cover material 42. In other words, the belt cover layer 15 may include the full cover 50 on the outer side in the tire radial direction of the first cover material 41 and the second cover material 42. The full cover 50 is formed by spirally winding the belt cover material 40 similar to the first cover material 41 and the second cover material 42 on the outer side in the tire radial direction of the first cover material 41 and the second cover material 42 between the shoulder regions Ash on both sides in the tire width direction.

In this way, by disposing the full cover 50 on the outer side in the tire radial direction of the first cover material 41 and the second cover material 42, the portion forming the overlapping portion 45 in the first cover material 41 or the second cover material 42 can be disposed away from the tread rubber layer 4. As a result, the edge separation caused by stress concentration at the contact portion between the inner end portion 41a (see FIG. 3) of the first cover material 41 and the inner end portion 42a (see FIG. 3) of the second cover material 42 and the tread rubber layer 4 can be more reliably reduced. As a result, while the edge separation of the overlapping portion 45 is more reliably reduced, shock burst resistance performance can be improved.

In the first embodiment described above, the first cover material 41 is spirally wound from the position between the shoulder region Ash on the second side S2 and the tire equatorial plane CL to the shoulder region Ash on the first side S1, and the second cover material 42 is spirally wound from the position between the shoulder region Ash on the first side S1 and the tire equatorial plane CL to the shoulder region Ash on the second side S2. However, the direction of winding the first cover material 41 and the second cover material 42 may be other than this. For example, the first cover material 41 may be spirally wound from the position of the shoulder region Ash on the first side S1 to the position between the shoulder region Ash on the second side S2 and the tire equatorial plane CL, and the second cover material 42 may be spirally wound from the position of the shoulder region Ash on the second side S2 to the position between the shoulder region Ash on the first side S1 and the tire equatorial plane CL.

Alternatively, the first cover material 41 and the second cover material 42 may be wound in the identical direction in the tire width direction. For example, the first cover material 41 may be spirally wound from the position between the shoulder region Ash on the second side S2 and the tire equatorial plane CL to the shoulder region Ash on the first side S1, and the second cover material 42 may be spirally wound from the position of the shoulder region Ash on the second side S2 to the position between the shoulder region Ash on the first side S1 and the tire equatorial plane CL. It is only required that the belt cover layer 15 is wound so as to ensure forming the overlapping portion 45 with the first cover material 41 and the second cover material 42, regardless of the direction of winding the first cover material 41 and the second cover material 42.

Furthermore, the above-described first to third embodiments and modified examples may be combined as appropriate. The pneumatic tire 1 forms the belt cover layer 15 by spirally winding at least the first cover material 41 and the second cover material 42 on the outer side of the belt layer 14 in the tire radial direction, and forms the overlapping portion 45 that goes across the tire equatorial plane CL in the tire width direction with the first cover material 41 and the second cover material 42. This allows improving productivity while a decrease in shock burst resistance performance is suppressed.

EXAMPLES

FIGS. 12A-12B include a table showing results of performance evaluation tests of pneumatic tires. Hereinafter, evaluation tests of the performance of the pneumatic tire 1 described above performed on pneumatic tires of Conventional Examples and the pneumatic tires 1 according to the embodiments of the present technology will be described. The performance evaluation tests performed a plunger test, which is an evaluation test for shock burst resistance performance, and a test on productivity during manufacturing a tire.

The performance evaluation tests were performed using the pneumatic tire 1 having the nominal size of 275/45ZR19 105Y of the tire defined by JATMA and mounted on a standard rim wheel of JATMA having a rim size of 19×9.5 J. The evaluation method for each of the test items was evaluated for the plunger test by filling the test tire with an air pressure of a regular internal pressure, performing a plunger breakage test, in accordance with JIS (Japanese Industrial Standard) K6302 with a plunger diameter of 19 mm and an insertion speed of 50 mm/minute, and measuring a tire breaking energy J. The evaluation results of the plunger test show that the greater the measured tire breaking energy J is, the superior a tire strength is and the superior shock burst resistance performance is. Note that, regarding shock burst resistance performance, even when a tire breaking energy is lower than those of Conventional Examples 1, 2, as long as the measured tire breaking energy exceeds 94% of the tire breaking energies of Conventional Examples 1, 2, the decrease in the shock burst resistance performance is regarded to be suppressed.

In addition, regarding productivity, a time required for winding the belt cover materials 40 in the step of winding the belt cover materials 40 during manufacturing the tire was measured. The productivity is expressed as index evaluations of a reciprocal of the measured time with Conventional Example 1 described below being assigned as 100. Larger index values indicate shorter winding time and higher productivity.

The performance evaluation test was performed on 14 types of pneumatic tires, which were pneumatic tires of Conventional Examples 1 and 2 as examples of the conventional pneumatic tires and Examples 1 to 12 as the pneumatic tires 1 according to the embodiments of the present technology. Of these, the pneumatic tire of Conventional Example 1 does not include the overlapping portion 45 in the belt cover layer 15. Note that in the pneumatic tire of Conventional Example 1, the belt cover layer 15 is formed by one belt cover material 40. In the pneumatic tire of Conventional Example 2, the belt cover layer 15 includes the overlapping portion 45, but the overlapping portion 45 is constituted by the single belt cover material 40, and the width W of the overlapping portion 45 in the tire width direction does not vary depending on the position in the tire circumferential direction and has a constant width.

In contrast, in Examples 1 to 12 as examples of the pneumatic tires 1 according to the embodiments of the present technology, all of the belt cover layers 15 include the overlapping portions 45, the overlapping portion 45 is constituted by the two belt cover materials 40, and the width W of the overlapping portion 45 in the tire width direction varies depending on the position in the tire circumferential direction. Moreover, in the pneumatic tires 1 according to Examples 1 to 16, each of the minimum width Wmin of the overlapping portion 45, the maximum width Wmax of the overlapping portion 45, presence of the adjacent wrap portion 46, and the width Wb of the adjacent wrap portion 46 to the width Wa of the belt cover material 40 differ.

As the result of the performance evaluation tests using these pneumatic tires 1, as shown in FIGS. 12A-12B, it has been found that the pneumatic tires 1 according to Examples 1 to 12 can increase productivity compared to those of Conventional Examples 1, 2 while a decrease in the shock burst resistance performance evaluated by the plunger test is suppressed to a much greater amount than those of Conventional Examples 1, 2. In other words, the pneumatic tires 1 according to Examples 1 to 12 and the manufacturing methods for the pneumatic tires 1 according to Examples 1 to 12 can improve productivity while suppressing a decrease in shock burst resistance performance.

The invention claimed is:

1. A pneumatic tire, comprising:
a tread portion;
a belt layer disposed in the tread portion; and
a belt cover layer disposed on an outer side in a tire radial direction of the belt layer,
the belt cover layer being formed by spirally winding band-like belt cover materials on the outer side of the belt layer in the tire radial direction around a tire rotation axis,
the belt cover materials comprising a first cover material and a second cover material,
when one side in a tire width direction with respect to a tire equatorial plane is defined as a first side and another side in the tire width direction with respect to the tire equatorial plane is defined as a second side, the first cover material being disposed from a position between a shoulder region on the second side and the tire equatorial plane to a shoulder region on the first side,
the second cover material being disposed from a position between the shoulder region on the first side and the tire equatorial plane to the shoulder region on the second side,
the first cover material and the second cover material having an overlapping portion at a position where positions in the tire width direction become positions identical to one another, the first cover material and the second cover material overlapping in the tire radial direction at the overlapping portion, and
the overlapping portion has a width in the tire width direction that varies depending on a position thereof in a tire circumferential direction.

2. The pneumatic tire according to claim 1, wherein the overlapping portion has a minimum width of the width in the tire width direction of not less than 5 mm, and the overlapping portion has a maximum width of the width in the tire width direction of not greater than 40 mm.

3. The pneumatic tire according to claim 1, wherein the belt cover materials are folded back in the tire radial direction at the shoulder regions.

4. The pneumatic tire according to claim 1, wherein the belt cover materials have a width in the tire width direction of portions overlapping in the tire radial direction of within a range of from not less than 5% to not greater than 50% of a width in the tire width direction of the belt cover layer.

5. The pneumatic tire according to claim 1,
wherein the belt cover materials comprise an adjacent wrap portion where portions adjacent in the tire width direction overlap in the tire radial direction by the spiral winding, and
the adjacent wrap portion has a width in the width direction of the belt cover materials in a range of from not less than 20% to not greater than 70% of a width of the belt cover materials.

6. The pneumatic tire according to claim 5, wherein at least one of the first cover material or the second cover material comprises the adjacent wrap portion such that the overlapping portion has a portion where the belt cover materials are three or more layers.

7. The pneumatic tire according to claim 1, wherein the first cover material and the second cover material are an identical type.

8. A method for manufacturing a pneumatic tire that spirally winds band-like belt cover materials on an outer side in a tire radial direction of a belt layer around a tire rotation axis to dispose a belt cover layer, the method comprising:
using a first cover material and a second cover material as the belt cover materials;
when one side in a tire width direction with respect to a tire equatorial plane is defined as a first side and another side in the tire width direction with respect to the tire equatorial plane is defined as a second side;
spirally winding the first cover material from a position between a shoulder region on the second side and the tire equatorial plane to a shoulder region on the first side; and
spirally winding the second cover material from a position between the shoulder region on the first side and the tire equatorial plane to the shoulder region on the second side,
winding the first cover material and winding the second cover material overlap the first cover material and the second cover material in the tire radial direction at a portion where positions in the tire width direction are an identical position between the first cover material and the second cover material to form an overlapping portion, the overlapping portion having a width in the tire width direction that varies depending on a position thereof in a tire circumferential direction, the first cover material and the second cover material overlapping in the tire radial direction at the overlapping portion.

9. The method for manufacturing the pneumatic tire according to claim 8, wherein
the winding of the first cover material spirally winds the first cover material from the position between the shoulder region on the second side and the tire equatorial plane to the shoulder region on the first side; and
the winding of the second cover material spirally winds the second cover material from the position between the shoulder region on the first side and the tire equatorial plane to the shoulder region on the second side.

10. The pneumatic tire according to claim 2, wherein the belt cover materials are folded back in the tire radial direction at the shoulder regions.

11. The pneumatic tire according to claim 10, wherein the belt cover materials have a width in the tire width direction of portions overlapping in the tire radial direction of within a range of from not less than 5% to not greater than 50% of a width in the tire width direction of the belt cover layer.

12. The pneumatic tire according to claim 11,
wherein the belt cover materials comprise an adjacent wrap portion where portions adjacent in the tire width direction overlap in the tire radial direction by the spiral winding, and
the adjacent wrap portion has a width in the width direction of the belt cover materials in a range of from not less than 20% to not greater than 70% of a width of the belt cover materials.

13. The pneumatic tire according to claim 12, wherein at least one of the first cover material or the second cover material comprises the adjacent wrap portion such that the overlapping portion has a portion where the belt cover materials are three or more layers.

14. The pneumatic tire according to claim 13, wherein the first cover material and the second cover material are an identical type.

\* \* \* \* \*